(12) United States Patent
Kimura

(10) Patent No.: US 10,567,730 B2
(45) Date of Patent: Feb. 18, 2020

(54) DISPLAY DEVICE AND CONTROL METHOD THEREFOR

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 61 days.

(21) Appl. No.: 15/895,237

(22) Filed: Feb. 13, 2018

(65) Prior Publication Data

US 2018/0241983 A1    Aug. 23, 2018

(30) Foreign Application Priority Data

Feb. 20, 2017    (JP) ................................ 2017-028665

(51) Int. Cl.
*H04N 13/122* (2018.01)
*H04N 13/183* (2018.01)
*H04N 13/128* (2018.01)
*H04N 13/156* (2018.01)
*H04N 13/344* (2018.01)

(52) U.S. Cl.
CPC ......... *H04N 13/122* (2018.05); *H04N 13/128* (2018.05); *H04N 13/156* (2018.05); *H04N 13/183* (2018.05); *H04N 13/344* (2018.05)

(58) Field of Classification Search
CPC .. H04N 13/122; H04N 13/128; H04N 13/156; H04N 13/183; H04N 13/344
See application file for complete search history.

(56) References Cited

U.S. PATENT DOCUMENTS

| | | | | |
|---|---|---|---|---|
| 6,559,813 B1* | 5/2003 | DeLuca | ................ | G02B 27/22 345/8 |
| 8,893,010 B1* | 11/2014 | Brin | .................. | H04L 29/06476 715/738 |
| 8,930,195 B1* | 1/2015 | Lebeau | ................ | G02B 27/017 704/275 |
| 8,971,570 B1* | 3/2015 | Raffle | ................ | G06K 9/00604 382/103 |
| 8,982,471 B1* | 3/2015 | Starner | .................... | G02B 5/30 359/13 |
| 9,094,678 B1* | 7/2015 | Slavenburg | .......... | G09G 3/3614 |
| 9,106,894 B1* | 8/2015 | Kvaalen | ............. | G06F 16/1744 |

(Continued)

FOREIGN PATENT DOCUMENTS

JP    2011-172216 A    9/2011

*Primary Examiner* — Peter D Le
(74) *Attorney, Agent, or Firm* — Oliff PLC

(57) ABSTRACT

A display device includes an image display section for left eye, an image display section for right eye, and a control section configured to expand the image data for the eyes, and cause the image display section for the eyes to display the expanded image data for the eyes. The control section acquires compressed UI image data, draws the compressed UI image data in a predetermined position of one of the image data for left eye before the expansion and the image data for right eye before the expansion, draws the compressed UI image data in a position corresponding to the predetermined position of the other of the image data for left eye before the expansion and the image data for right eye before the expansion, and performs the expansion using the image data for left eye and for right eye after the drawing.

11 Claims, 22 Drawing Sheets

(56) References Cited

U.S. PATENT DOCUMENTS

| | | | |
|---|---|---|---|
| 9,213,403 B1* | 12/2015 | Raffle | G06F 3/011 |
| 2002/0044152 A1* | 4/2002 | Abbott, III | G06T 11/00 |
| | | | 345/629 |
| 2004/0066555 A1* | 4/2004 | Nomura | G02B 27/2228 |
| | | | 359/462 |
| 2006/0061544 A1* | 3/2006 | Min | G02B 27/0093 |
| | | | 345/156 |
| 2007/0046805 A1* | 3/2007 | Nakanishi | G02B 27/017 |
| | | | 348/333.01 |
| 2008/0088529 A1* | 4/2008 | Tang | G02B 27/0172 |
| | | | 345/8 |
| 2009/0128622 A1* | 5/2009 | Uchiumi | H04N 13/183 |
| | | | 348/51 |
| 2010/0272417 A1* | 10/2010 | Nagasawa | H04N 19/597 |
| | | | 386/341 |
| 2011/0181692 A1* | 7/2011 | Kuno | H04N 13/183 |
| | | | 348/43 |
| 2011/0279647 A1* | 11/2011 | Nishimura | H04N 13/128 |
| | | | 348/43 |
| 2012/0038745 A1* | 2/2012 | Yu | G06T 15/08 |
| | | | 348/46 |
| 2012/0120068 A1* | 5/2012 | Chiaki | H04N 13/261 |
| | | | 345/419 |
| 2012/0127273 A1* | 5/2012 | Zhang | H04N 13/128 |
| | | | 348/46 |
| 2012/0127284 A1* | 5/2012 | Bar-Zeev | G02B 27/017 |
| | | | 348/53 |
| 2012/0154277 A1* | 6/2012 | Bar-Zeev | G02B 27/017 |
| | | | 345/158 |
| 2012/0200592 A1* | 8/2012 | Kimura | G09G 3/001 |
| | | | 345/619 |
| 2013/0050258 A1* | 2/2013 | Liu | G02B 27/017 |
| | | | 345/633 |
| 2013/0088413 A1* | 4/2013 | Raffle | G02B 27/0101 |
| | | | 345/7 |
| 2013/0176533 A1* | 7/2013 | Raffle | A61B 3/113 |
| | | | 351/209 |
| 2013/0182081 A1* | 7/2013 | Greenberg | G02B 21/22 |
| | | | 348/49 |
| 2013/0235331 A1* | 9/2013 | Heinrich | G02C 11/10 |
| | | | 351/158 |
| 2013/0241805 A1* | 9/2013 | Gomez | G09G 3/003 |
| | | | 345/8 |
| 2013/0246967 A1* | 9/2013 | Wheeler | G06F 3/012 |
| | | | 715/784 |
| 2014/0078175 A1* | 3/2014 | Forutanpour | G02B 27/017 |
| | | | 345/633 |
| 2014/0081634 A1* | 3/2014 | Forutanpour | G06F 17/289 |
| | | | 704/235 |
| 2014/0146124 A1* | 5/2014 | Jang | H04N 7/141 |
| | | | 348/14.03 |
| 2014/0184724 A1* | 7/2014 | Cho | H04N 7/144 |
| | | | 348/14.07 |
| 2014/0225918 A1* | 8/2014 | Mittal | G06F 3/017 |
| | | | 345/633 |
| 2014/0233108 A1* | 8/2014 | Cazalet | G02B 27/0172 |
| | | | 359/630 |
| 2014/0247286 A1* | 9/2014 | Chi | G09G 3/003 |
| | | | 345/672 |
| 2014/0267400 A1* | 9/2014 | Mabbutt | G06T 19/006 |
| | | | 345/633 |
| 2014/0282144 A1* | 9/2014 | Maciocci | G06F 3/0481 |
| | | | 715/765 |
| 2014/0285404 A1* | 9/2014 | Takano | G06F 3/005 |
| | | | 345/8 |
| 2014/0368539 A1* | 12/2014 | Yeh | G02B 27/017 |
| | | | 345/633 |
| 2014/0368980 A1* | 12/2014 | Nanavati | G06Q 30/016 |
| | | | 361/679.03 |
| 2015/0022551 A1* | 1/2015 | Kim | G06T 19/006 |
| | | | 345/633 |
| 2015/0035727 A1* | 2/2015 | Kobayashi | G09G 3/003 |
| | | | 345/8 |
| 2015/0123895 A1* | 5/2015 | Takano | G06F 3/0304 |
| | | | 345/156 |
| 2015/0138224 A1* | 5/2015 | Kim | G02B 27/0172 |
| | | | 345/592 |
| 2015/0169070 A1* | 6/2015 | Harp | G06F 3/017 |
| | | | 345/419 |
| 2015/0170418 A1* | 6/2015 | Flynn | G06F 3/04815 |
| | | | 345/633 |
| 2015/0193018 A1* | 7/2015 | Venable | G06F 3/0346 |
| | | | 345/158 |
| 2015/0237336 A1* | 8/2015 | Sylvan | H04N 13/344 |
| | | | 348/54 |
| 2015/0279110 A1* | 10/2015 | Kimura | G06T 19/006 |
| | | | 345/633 |
| 2016/0018645 A1* | 1/2016 | Haddick | G06T 19/006 |
| | | | 345/8 |
| 2017/0011254 A1* | 1/2017 | Guo | G06F 16/50 |

\* cited by examiner

WHEN COORDINATE POSITION P OF CURSOR CORRESPONDS TO LEFT HALF

WHEN COORDINATE POSITION P OF CURSOR CORRESPONDS TO RIGHT HALF

DISPLAY DEVICE AND CONTROL METHOD THEREFOR

BACKGROUND

1. Technical Field

The present invention relates to a display device and a control method for the display device.

2. Related Art

As one of techniques for enabling display of a stereoscopic video, there has been known a technique for including, in one video, compressed image data for left eye and compressed image data for right eye, expanding the image data for left eye and causing a display section for left eye to display the image data for left eye, and expanding the image data for right eye and causing a display section for right eye to display the image data for right eye. On the other hand, JP-A-2011-172216 (Patent Literature 1) describes a configuration for displaying an OSD (On Screen Display) display image in a device that displays a stereoscopic video.

In the related art, when the OSD display image is superimposed on the stereoscopic video and displayed, the OSD display image is also expanded to be a GUI hard to operate for a user. Note that, such a problem is not only a problem for the OSD display image but also a problem common to display of a UI element configuring a user interface. Therefore, there is a demand for a technique for make it possible to operate the UI element with high operability when the UI element is superimposed and displayed on a stereoscopic video (a 3D image).

SUMMARY

An advantage of some aspects of the invention is to solve at least a part of the problem, and the invention can be realized as the following aspects.

(1) According to an aspect of the invention, a display device that superimposes and displays a UI element configuring a user interface on a 3D image is provided. The display device includes: an image display section for left eye disposed in front of a left eye; an image display section for right eye disposed in front of a right eye; a 3D-image-data storing section configured to store 3D image data in which, with a lateral direction or a longitudinal direction set as a predetermined direction, one frame is configured by image data for left eye and image data for right eye compressed in the predetermined direction; and a control section configured to expand the image data for left eye and the image data for right eye obtained from the 3D image data respectively in the predetermined direction, cause the image display section for left eye to display the expanded image data for left eye, and cause the image display section for right eye to display the expanded image data for right eye. The control section acquires compressed UI image data obtained by compressing image data of the UI element in the predetermined direction, draws the compressed UI image data in a predetermined position of one of the image data for left eye before the expansion and the image data for right eye before the expansion, draws the compressed UI image data in a position corresponding to the predetermined position of the other of the image data for left eye before the expansion and the image data for right eye before the expansion, and performs the expansion using the image data for left eye after the drawing and the image data for right eye after the drawing. With the display device according to the aspect, in the image data for left eye and the image data for right eye after the expansion, the UI element is drawn in the same relative position in images of the respective image data while keeping an uncompressed original shape. Therefore, when the UI element is superimposed and displayed on a 3D image, a user can operate the UI element with high operability. Therefore, with the display device according to the aspect, it is possible to improve the operability of the UI element.

(2) In the display device, the 3D image data may be image data of a file format of a side-by-side system. According to the display device with this configuration, when 3D image data of the side-by-side system is displayed, it is possible to improve the operability of the UI element.

(3) In the display device, the UI element may be a cursor. According to the display device with this configuration, it is possible to improve the operability of the cursor.

(4) In the display device, the display device may further include a position designating section for designating a position of the cursor on a screen, and, when the designated position designated by the position designating section overlaps a region for display for displaying the 3D image, the control section may set, as the predetermined position, a relative position of the designated position in the region for display. According to the display device with this configuration, it is possible to improve operability in moving the cursor with the position designating section.

(5) In the display device, the UI element may be an OSD display image. According to the display device with this configuration, it is possible to improve the operability of OSD.

(6) In the display device, the predetermined position and the position corresponding to the predetermined position may be a same coordinate position in image data respectively corresponding to the predetermined position and the position corresponding to the predetermined position. According to display device with this configuration, it is possible to clearly display the cursor while keeping the uncompressed original shape. Therefore, it is possible to further improve the operability of the cursor.

(7) In the display device, the predetermined position and the position corresponding to the predetermined position may be decided such that a parallax is formed between an image of the UI element drawn on the image data for left eye after the expansion and an image of the UI element drawn on the image data for right eye after the expansion. According to the display device with this configuration, it is possible to stereoscopically display the UI element.

(8) In the display device, the display device may further include a distance detecting section configured to detect a distance to an object that operates the UI element, and the predetermined position and the position corresponding to the predetermined position may be respectively decided according to the detected distance. According to the display device with this configuration, it is possible to adjust a pop-up feeling of the UI element.

(9) In the display device, when the compressed UI image data is drawn in the one predetermined position, when a drawing range of the compressed UI image data straddles across a boundary line between the image data for left eye and the image data for right eye, only a partial image of the compressed UI image data included in a side of one of the image data for left eye and the image data for right eye may be drawn. According to the display device with this configuration, when the drawing range of the compressed cursor straddles across the boundary line between the image data for left eye and the image data for right eye arranged side by side, it is possible to prevent the compressed cursor from remaining at both ends and further improve the operability of the user.

(10) In the display device, the display device may be a head-mounted display device mounted on a head of a user. According to the display device with this configuration, it is possible to further improve the operability of the user.

The invention can also be realized in various forms other than the display device. The invention can be realized as a control method for the display device, a computer program for realizing the functions of the components included in the display device, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. A Basic Configuration of a Head-Mounted Display Device

Figure 1:
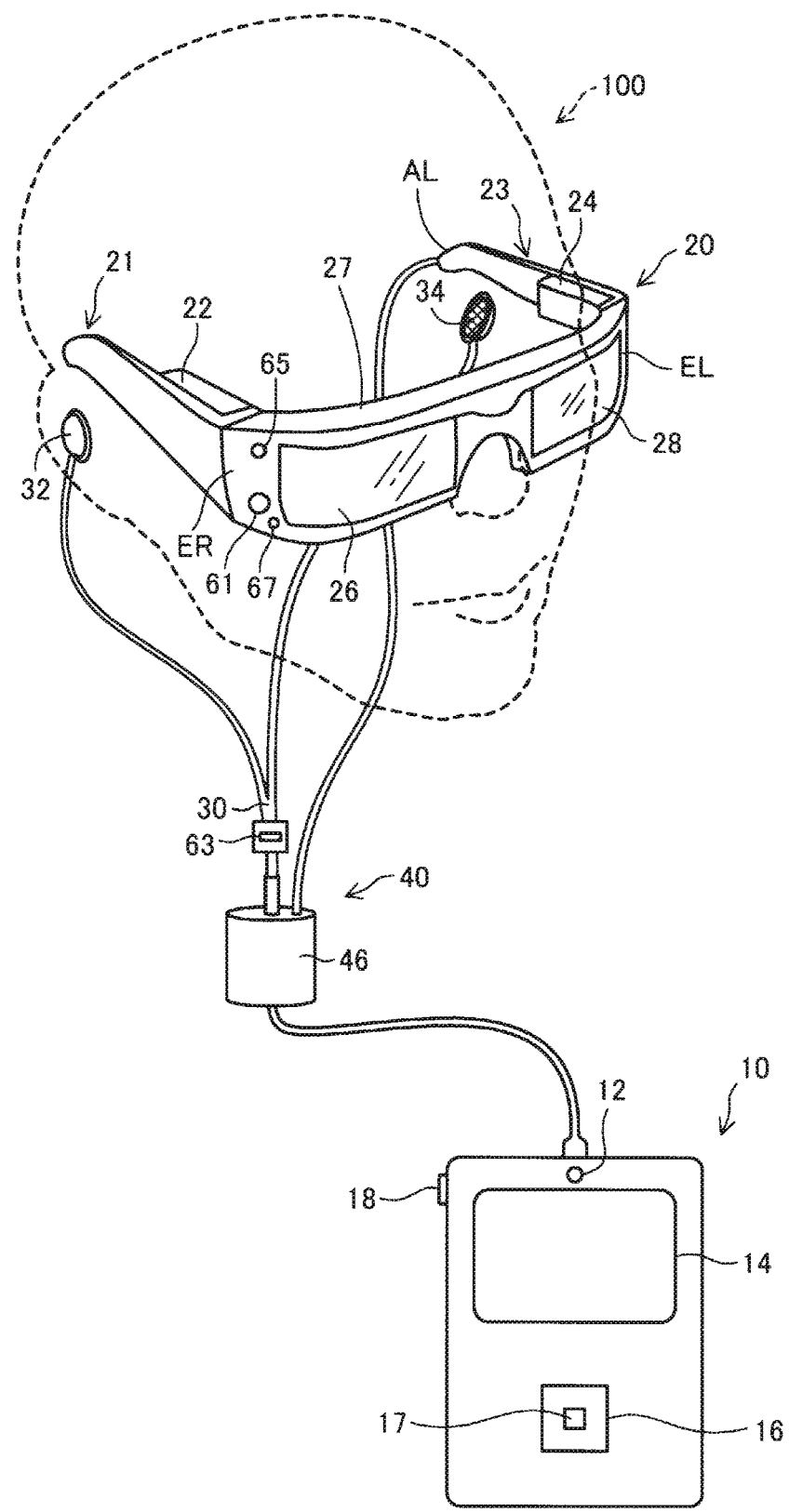
FIG. 1 is an explanatory diagram showing a schematic configuration of a display system in a first embodiment of the invention.

FIG. 1 is an explanatory diagram showing a schematic configuration of a head-mounted display device in a first embodiment of the invention. A head-mounted display device 100 is a display device mounted on the head of a user and is also called head mounted display (HMD). The HMD 100 is a head-mounted display device of a see-through type (a transmission type) that causes an image to emerge in an outside world visually recognized through glass.

The HMD 100 includes an image display section 20 that causes the user to visually recognize an image and a control device (a controller) 10 that controls the image display section 20.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a supporting body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL of the front frame 27 to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to a position in the middle of the forehead of the user in the worn state of the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the head of the user by the nose pad section and the right holding section 21 and the left holding section 23. A belt in contact with the back of the head of the user in the worn state of the image display section 20 may be coupled to the right holding section 21 and the left holding section 23. In this case, the image display section 20 can be firmly held on the head of the user by the belt.

The right display unit 22 performs display of an image by the right light guide plate 26. The right display unit 22 is provided in the right holding section 21 and located in the vicinity of the right temporal region of the user in the worn state of the image display section 20. The left display unit 24 performs display of an image by the left light guide plate 28. The left display unit 24 is provided in the left holding section 23 and located in the vicinity of the left temporal region of the user in the worn state of the image display section 20. Note that the right display unit 22 and the left display unit 24 are collectively referred to as "display driving section" as well.

The right light guide plate 26 and the left light guide plate 28 in this embodiment are optical sections (e.g., prisms) formed of light transmissive resin or the like. The right light guide plate 26 and the left light guide plate 28 guide image lights output by the right display unit 22 and the left display unit 24 to the eyes of the user. Note that a dimming plate may be provided on the surfaces of the right light guide plate 26 and the left light guide plate 28. The dimming plate is a thin plate-like optical element having different transmittance depending on a wavelength region of light. The dimming plate functions as a so-called wavelength filter. For example, the dimming plate is disposed to cover a surface (a surface on the opposite side of a surface opposed to the eyes of the user) of the front frame 27. By selecting an optical characteristic of the dimming plate as appropriate, it is possible to adjust the transmittances of lights in any wavelength regions such as visible light, infrared light, and ultraviolet light. It is possible to adjust a light amount of external light made incident on the right light guide plate 26 and the left light guide plate 28 from the outside and transmitted through the right light guide plate 26 and the left light guide plate 28.

The image display section 20 guides image lights respectively generated by the right display unit 22 and the left display unit 24 to the right light guide plate 26 and the left light guide plate 28 and causes the user to visually recognize an image (an augmented reality (AR) image) with the image lights (this is referred to as "display an image" as well). When the external light is transmitted through the right light guide plate 26 and the left light guide plate 28 and made incident on the eyes of the user from the front of the user, the image lights forming the image and the external light are made incident on the eyes of the user. Therefore, visibility of the image in the user is affected by the intensity of the external light.

Therefore, it is possible to adjust easiness of the visual recognition of the image by, for example, attaching the dimming plate to the front frame 27 and selecting or adjusting the optical characteristic of the dimming plate as appropriate. In a typical example, it is possible to select a dimming plate having light transmittance of a degree for enabling the user wearing the HMD 100 to visually recognize at least a scene on the outside. When the dimming plate is used, it is possible to expect an effect of protecting the right light guide plate 26 and the left light guide plate 28 and suppressing damage, adhesion of soil, and the like to the right light guide plate 26 and the left light guide plate 28. The dimming plate may be detachably attachable to the front frame 27 or each of the right light guide plate 26 and the left light guide plate 28. A plurality of kinds of dimming plates may be able to be alternately attached. The dimming plates may be omitted.

A camera 61 is disposed in the front frame 27 of the image display section 20. The camera 61 is provided in a position where the camera 61 does not block external light transmitted through the right light guide plate 26 and the left light guide plate 28 on the front surface of the front frame 27. In the example shown in FIG. 1, the camera 61 is disposed on the end portion ER side of the front frame 27. The camera 61 may be disposed on the end portion EL side of the front frame 27 or may be disposed in a coupling section of the right light guide plate 26 and the left light guide plate 28.

The camera 61 is a digital camera including an imaging device such as a CCD or a CMOS and an imaging lens. The camera 61 in this embodiment is a monocular camera. However, a stereo camera may be adopted. The camera 61 images at least a part of an outside scene (a real space) in a front side direction of the HMD 100, in other words, a visual field direction visually recognized by the user in the worn state of the image display section 20. In other words, the camera 61 images a range or a direction overlapping the visual field of the user and images a direction visually recognized by the user. The breadth of an angle of view of the camera 61 can be set as appropriate. In this embodiment, the breadth of the angle of view of the camera 61 is set to image the entire visual field of the user visually recognizable by the user through the right light guide plate 26 and the left light guide plate 28. The camera 61 executes the imaging according to control by a control function section 150 (FIG. 6) and outputs obtained captured image data to the control function section 150.

The HMD 100 may include a distance measurement sensor that detects a distance to a measurement target object located in a preset measurement direction. The distance measurement sensor can be disposed in, for example, a coupling portion of the right light guide plate 26 and the left light guide plate 28 in the front frame 27. The measurement direction of the distance measurement sensor can be set to the front side direction of the HMD 100 (a direction overlapping the imaging direction of the camera 61). The distance sensor can be configured by, for example, a light emitting section such as an LED or a laser diode and a light receiving section that receives reflected light of light emitted by a light source and reflected on the measurement target object. In this case, the distance is calculated by triangulation processing and distance measurement processing based on a time difference. The distance sensor may be configured by, for example, an emitting section that emits ultrasound and a receiving section that receives the ultrasound reflected on the measurement target object. In this case, the distance is calculated by the distance measurement processing based on a time difference. Like the camera 61, the distance measurement sensor is controlled by the control function section 150 (FIG. 6) and outputs a detection result to the control function section 150.

Figure 2:
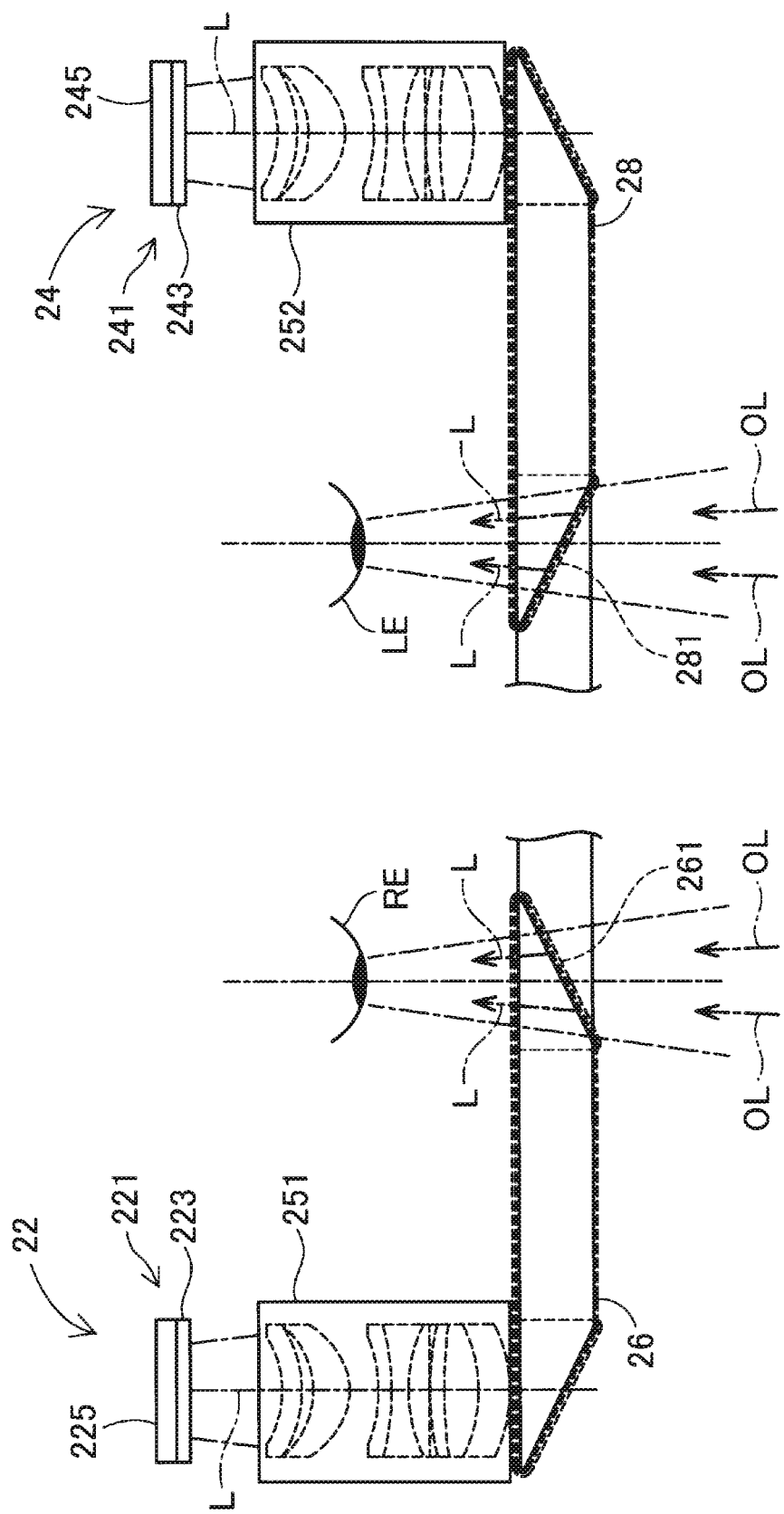
FIG. 2 is a main part plan view showing the configuration of an optical system included in an image display section.

FIG. 2 is a main part plan view showing the configuration of an optical system included in the image display section 20. In FIG. 2, a right eye RE and a left eye LE of the user are shown for convenience of explanation. As shown in FIG. 2, the right display unit 22 and the left display unit 24 are symmetrically configured.

As components for causing the right eye RE to visually recognize an image (an AR image), the right display unit 22 includes an OLED (Organic Light Emitting Diode) unit 221 and a right optical system 251. The OLED unit 221 emits image light. The right optical system 251 includes a lens group and guides the image light L emitted by the OLED unit 221 to the right light guide plate 26.

The OLED unit 221 includes an OLED panel 223 and an OLED driving circuit 225 that drives the OLED panel 223. The OLED panel 223 is a self-emitting display panel configured by light emitting elements that emit lights with organic electroluminescence and respectively emit color lights of R (red), G (green), and B (blue). In the OLED panel 223, a plurality of pixels, one pixel of which is a unit including one each of R, G, and B elements, are arranged in a matrix shape.

Figure 5:
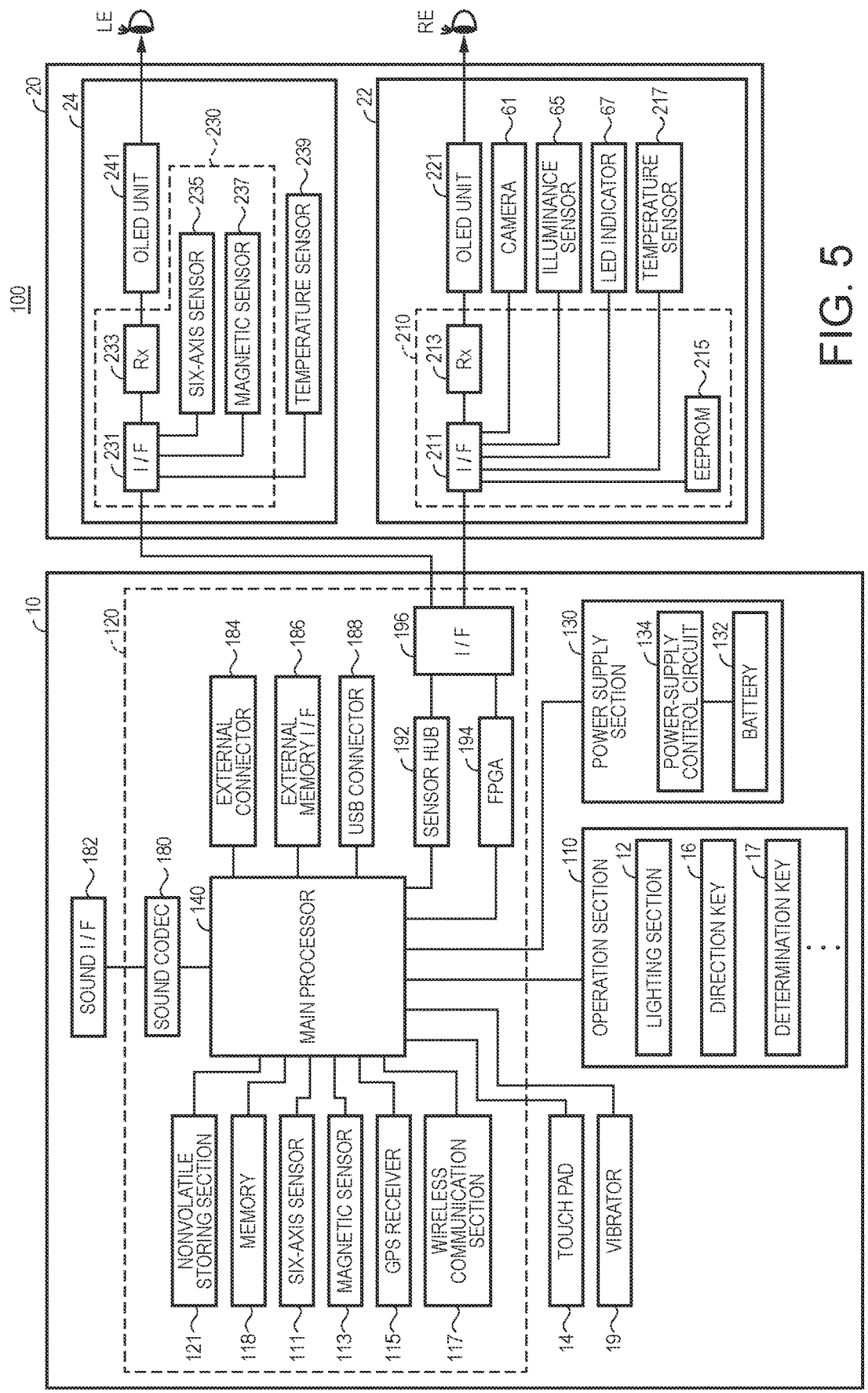
FIG. 5 is a block diagram functionally showing the configuration of an HMD.
Figure 6:
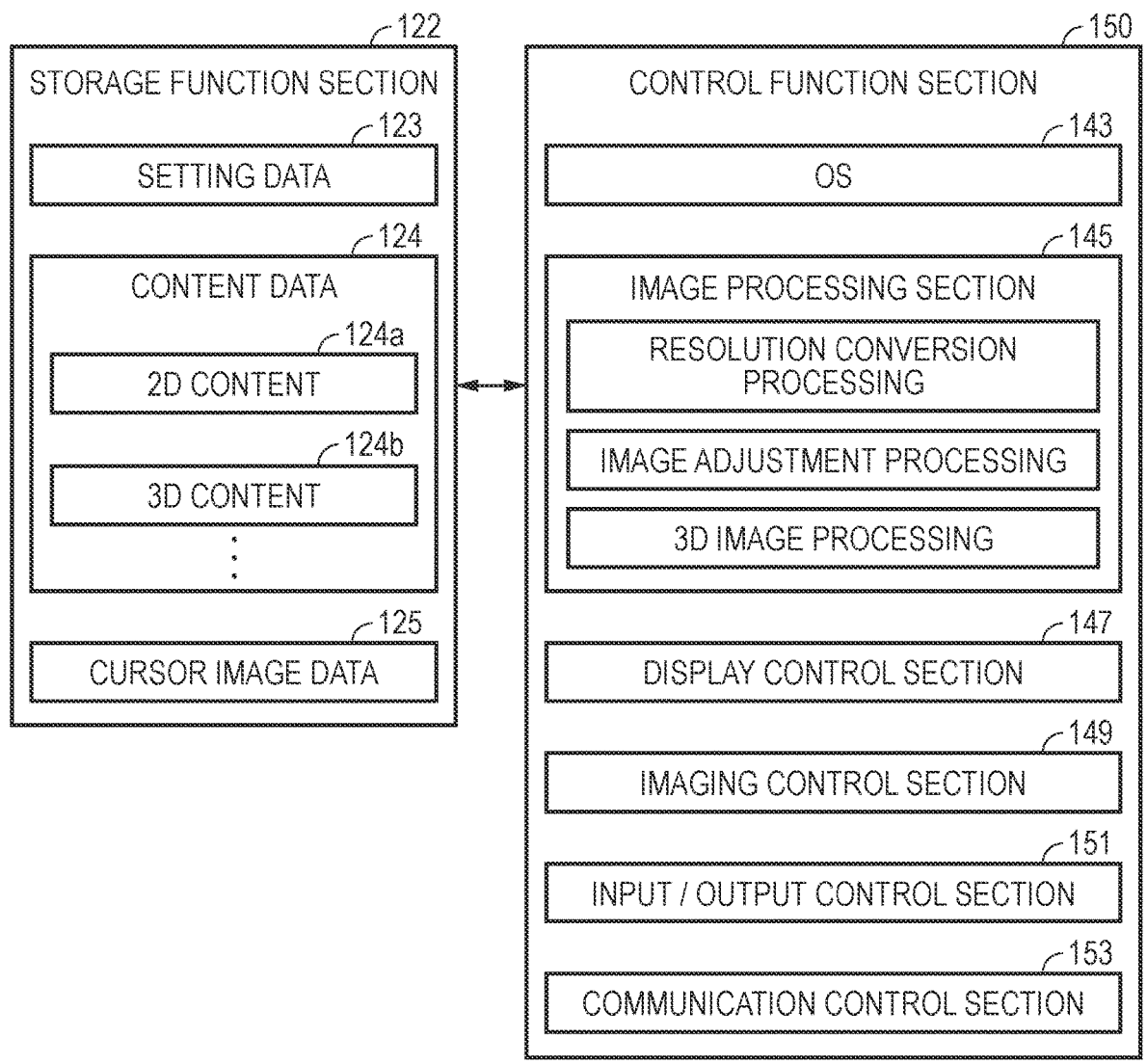
FIG. 6 is a block diagram functionally showing the configuration of a control device.

The OLED driving circuit 225 executes selection of a light emitting element included in the OLED panel 223 and energization to the light emitting element and causes the light emitting element to emit light according to the control by the control function section 150 (FIG. 6). The OLED driving circuit 225 is fixed to the rear side of a rear surface, that is, a light emitting surface of the OLED panel 223 by bonding or the like. The OLED driving circuit 225 may be configured by, for example, a semiconductor device that drives the OLED panel 223 and mounted on a substrate fixed to the rear surface of the OLED panel 223. A temperature sensor 217 (FIG. 5) explained below is mounted on the substrate. Note that, as the OLED panel 223, a configuration may be adopted in which light emitting elements that emit white light are arranged in a matrix shape and color filters corresponding to the colors of R, G, and B are disposed to be superimposed one on top of another. The OLED panel 223 of a WRGB configuration including a light emitting element that emits W (white) light in addition to the light emitting elements that respectively emit the color lights of R, G, and B may be adopted.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed in the right light guide plate 26. The image light L is reflected on the half mirror 261 and thereafter emitted from the right light guide plate 26 toward the right eye RE. The image light L forms an image on the retina of the right eye RE to cause the user to visually recognize the image.

The left display unit 24 includes, as components for causing the left eye LE to visually recognize an image (an AR image), an OLED unit 241 and a left optical system 252. The OLED unit 241 emits image light. The left optical system 252 includes a lens group and guides the image light L emitted by the OLED unit 241 to the left light guide plate 28. The OLED unit 241 includes an OLED panel 243 and an OLED driving circuit 245 that drives the OLED panel 243. Details of the sections are the same as the details of the OLED unit 221, the OLED panel 223, and the OLED driving circuit 225. A temperature sensor 239 (FIG. 5) is mounted on a substrate fixed to the rear surface of the OLED panel 243. Details of the left optical system 252 are the same as the details of the right optical system 251.

With the configuration explained above, the HMD 100 can function as a see-through type display device. That is, the image light L reflected on the half mirror 261 and external light OL transmitted through the right light guide plate 26 are made incident on the right eye RE of the user. The image light L reflected on a half mirror 281 and the external light OL transmitted through the left right guide plate 28 are made incident on the left eye LE of the user. In this way, the HMD 100 makes the image light L of the image processed on the inside and the external light OL incident on the eyes of the user to be superimposed one on top of the other. As a result, for the user, the outside scene (the real world) is seen through the right light guide plate 26 and the left light guide plate 28. An image (an AR image) formed by the image light L is visually recognized over the outside scene.

Note that the right display unit 22 and the right light guide plate 26 are equivalent to the "image display section for right eye" in the aspect of the invention described in the summary. The left display unit 24 and the left light guide plate 28 are equivalent to the "image display section for left eye" in the aspect of the invention described in the summary. The half mirror 261 and the half mirror 281 function as "image extracting sections" that reflect image lights respectively output by the right display unit 22 and the left display unit 24 and extract images. The right optical system 251 and the right light guide plate 26 are collectively referred to as "right light guide section" as well. The left optical system 252 and the left light guide plate 28 are collectively referred to as "left light guide section" as well. The configuration of the right light guide section and the left guide section is not limited to the example explained above. Any system can be used as long as the right light guide section and the left guide section form an image in front of the eyes of the user using image light. For example, as the right light guide section and the left light guide section, a diffraction grating may be used or a semitransmitting reflection film may be used.

In FIG. 1, the control device 10 and the image display section 20 are connected by a connection cable 40. The connection cable 40 is detachably connected to a connector provided in a lower part of the control device 10 and is connected from a distal end AL of the left holding section 23 to various circuits inside the image display section 20. The connection cable 40 includes a metal cable or an optical fiber cable for transmitting digital data. The connection cable 40 may further include a metal cable for transmitting analog data. A connector 46 is provided halfway in the connection cable 40.

The connector 46 is a jack to which a stereo mini plug is connected. The connector 46 and the control device 10 are connected by, for example, a line for transmitting an analog sound signal. In a configuration example shown in FIG. 1, ahead set 30 including a right earphone 32 and a left earphone 34 configuring a stereo headphone and a microphone 63 is connected to the connector 46.

For example, as shown in FIG. 1, the microphone 63 is disposed such that a sound collecting section of the microphone 63 faces a line of sight direction of the user. The microphone 63 collects sound and outputs a sound signal to a sound interface 182 (FIG. 5). The microphone 63 may be a monaural microphone or may be a stereo microphone, may be a microphone having directivity, or may be a nondirectional microphone.

The control device 10 is a device for controlling the HMD 100 (in particular, the image display section 20). The control device 10 includes a lighting section 12, a touch pad 14, a direction key 16, a determination key 17, and a power switch 18. The lighting section 12 notifies, with a light emitting form thereof, an operation state (e.g., ON or OFF of a power supply) of the HMD 100. As the lighting section 12, for example, an LED (Light Emitting Diode) can be used.

The touch pad 14 detects touch operation on an operation surface of the touch pad 14 and outputs a signal corresponding to detection content. As the touch pad 14, various kinds of touch pads such as an electrostatic type, a pressure detection type, and an optical type can be adopted. The direction key 16 detects pressing operation on keys corresponding to the upward, downward, left, and right directions and outputs a signal corresponding to detection content. The determination key 17 detects pressing operation and outputs a signal for determining content of operation in the control device 10. The power switch 18 detects slide operation of the switch to change a state of the power supply of the HMD 100.

Figure 3:
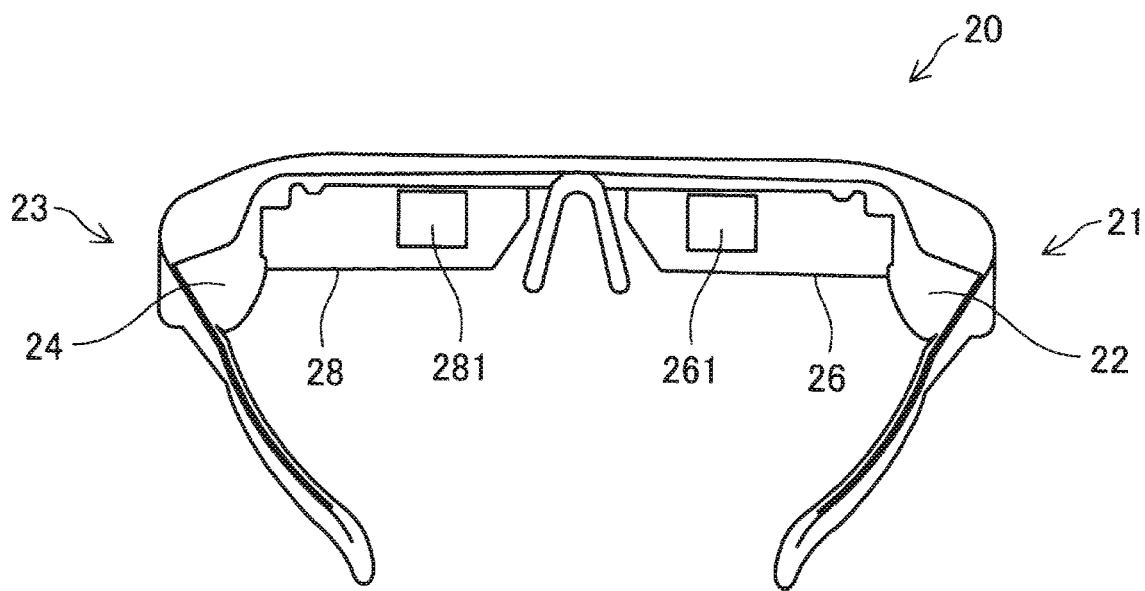
FIG. 3 is a diagram showing a main part configuration of the image display section viewed from a user.

FIG. 3 is a diagram showing a main part configuration of the image display section 20 viewed from the user. In FIG. 3, the connection cable 40, the right earphone 32, and the left earphone 34 are not shown. In a state shown in FIG. 3, the rear sides of the right light guide plate 26 and the left light guide plate 28 can be visually recognized. The half mirror 261 for irradiating image light on the right eye RE and the half mirror 281 for irradiating image light on the left eye LE can be visually recognized as substantially square regions. The user visually recognizes an outside scene through the entire left and right light guide plates 26 and 28 including the half mirrors 261 and 281 and visually recognizes rectangular display images in the positions of the half mirrors 261 and 281.

Figure 4:
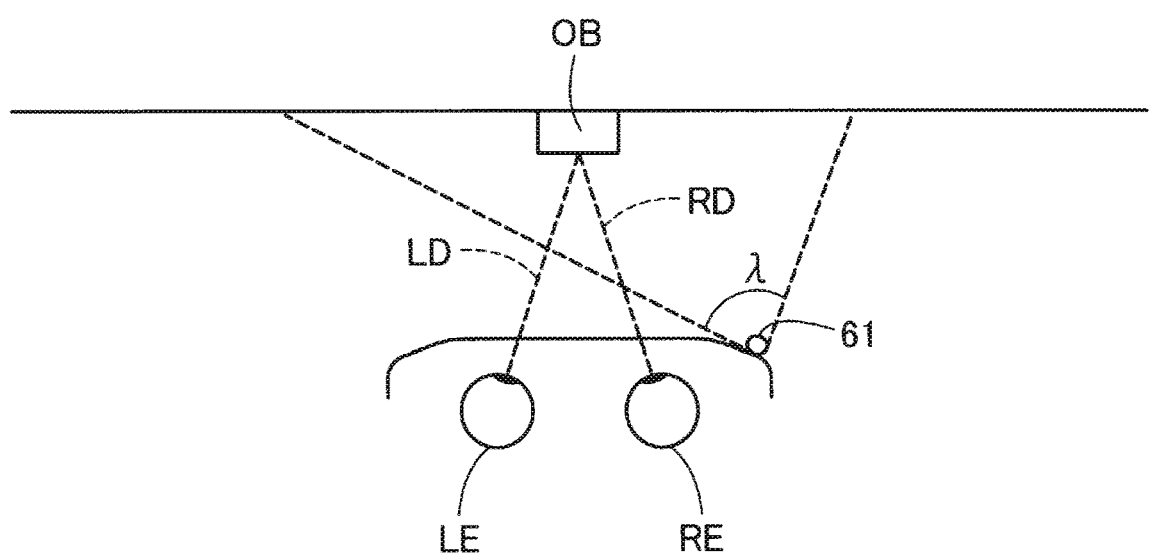
FIG. 4 is a diagram for explaining an angle of view of a camera.

FIG. 4 is a diagram for explaining an angle of view of the camera 61. In FIG. 4, the camera 61 and the right eye RE and the left eye LE of the user are schematically shown in plan view. The angle of view (an imaging range) of the camera 61 is indicated by λ. Note that the angle of view λ of the camera 61 expands in the horizontal direction and also expands in the vertical direction as in a general digital camera.

As explained above, the camera 61 is disposed at the end portion on the right side in the image display section 20. The camera 61 images a direction of a line of sight of the user (i.e., the front direction of the user). Therefore, an optical axis of the camera 61 is set in a direction including line of sight directions of the right eye RE and the left eye LE. An outside scene that can be visually recognized by the user in a state in which the user wears the HMD 100 is not always infinity. For example, when the user gazes an object OB with both the eyes, lines of sight of the user are directed to the object OB as indicated by signs RD and LD in the figure. In this case, the distance from the user to the object OB is often approximately 30 cm to 10 m and more often approximately 1 m to 4 m. Therefore, concerning the HMD 100, standards of an upper limit and a lower limit of the distance from the user to the object OB during a normal use may be set. The standards may be calculated in advance and preset in the HMD 100 or may be set by the user. An optical axis and an angle of view of the camera 61 are desirably set such that the object OB is included in the angle of view when the distance to the object OB during the normal use is equivalent to the set standards of the upper limit and the lower limit.

Note that, in general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. A stable field of fixation in which a gazing point gazed by the human is quickly and stably seen is approximately 60 to 90 degrees in the horizontal direction and approximately 45 to 70 degrees in the vertical direction. In this case, when the gazing point is the object OB (FIG. 4), a field of view of approximately 30 degree in the horizontal direction and approximately 20 degrees in the vertical direction centering on the lines of sight RD and LD is the effective field of view. A field of view of approximately 60 to 90 degrees in the horizontal direction and approximately 45 to 70 degrees in the vertical direction is the stable field of fixation. An actual field of view visually recognized by the user through the image display section 20 and through the right light guide plate 26 and the left light guide plate 28 is referred to as real field of view (FOV). The real field of view is narrower than the angular field of view and the stable field of fixation but is wider than the effective field of view.

The angle of view λ of the camera 61 in this embodiment is set to enable imaging of a range wider than the field of view of the user. The angle of view λ of the camera 61 is desirably set to enable imaging of a range wider than at least the effective field of view of the user. The angle of view λ of the camera 61 is more desirably set to enable imaging of a range wider than the real field of view of the user. The angle of view λ of the camera 61 is still more desirably set to enable imaging of a range wider than the stable field of fixation. The angle of view λ is most desirably set to enable imaging of a range wider than the angular field of view of both the eyes of the user. Therefore, the camera 61 may include a so-called wide-angle lens as an imaging lens and may be capable of imaging a wide angle of view. The wide-angle lens may include lenses called super-wide angle lens and semi-wide angle lens. The camera 61 may include a single focus lens, may include a zoom lens, and may include a lens group including a plurality of lenses.

FIG. 5 is a block diagram showing an electric configuration of the HMD 100. The control device 10 includes a main processor 140 that executes a computer program to control the HMD 100, a storing section, an input/output section, sensors, an interface, and a power supply section 130. The storing section, the input/output section, the sensors, the interface, and the power supply section 130 are connected to the main processor 140. The main processor 140 is mounted on a controller board 120 incorporated in the control device 10.

The storing section includes a memory 118 and a non-volatile storing section 121. The memory 118 configures a work area that temporarily stores computer programs executed by the main processor 140 and data processed by the main processor 140. The nonvolatile storing section 121 is configured by a flash memory or an eMMC (embedded Multi Media Card). The nonvolatile storing section 121 stores the computer programs executed by the main processor 140 and various data processed by the main processor 140. In this embodiment, these storing sections are mounted on the controller board 120.

The input/output section includes the touch pad 14 and an operation section 110. The operation section 110 includes the direction key 16, the determination key 17, and the power switch 18 included in the control device 10. The main processor 140 controls these input/output sections and acquires signals output from the input/output sections.

The sensors include a six-axis sensor 111, a magnetic sensor 113, and a GPS (Global Positioning System) receiver 115. The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted. The magnetic sensor 113 is, for example, a three-axis terrestrial magnetism sensor. The GPS receiver 115 includes a not-shown GPS antenna, receives radio signals transmitted from GPS satellites, and detects a coordinate of a present position of the control device 10. The sensors (the six-axis sensor 111, the magnetic sensor 113, and the GPS receiver 115) output detection values to the main processor 140 according to a sampling frequency designated in advance. Timing when the sensors output the detection values may correspond to an instruction from the main processor 140.

The interface includes a wireless communication section 117, a sound codec 180, an external connector 184, an external memory interface 186, a USB (Universal Serial Bus) connector 188, a sensor hub 192, an FPGA 194, and an interface 196. These components function as interfaces with the outside. The wireless communication section 117 executes wireless communication between the HMD 100 and an external apparatus. The wireless communication section 117 includes an antenna, an RF circuit, a baseband circuit, and a communication control circuit not shown in the figure. Alternatively, the wireless communication section 117 is configured as a device obtained by integrating these components. The wireless communication section 117 performs wireless communication conforming to standards such as Bluetooth (registered trademark) and a wireless LAN including Wi-Fi (registered trademark).

The sound codec 180 is connected to the sound interface 182 and performs encoding/decoding of sound signals input and output via the sound interface 182. The sound interface 182 is an interface that inputs and outputs sound signals. The sound codec 180 may include an A/D converter that performs conversion from an analog sound signal into digital sound data and a D/A converter that performs conversion opposite to the conversion of the A/D converter. The HMD 100 in this embodiment outputs sound from the right earphone 32 and the left earphone 34 and collects sound with the microphone 63 (FIG. 1). The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector for connecting external devices (e.g., a personal computer, a smart phone, and a game machine), which communicate with the main processor 140, to the main processor 140. The external devices connected to the external connector 184 can be supply sources of contents and can be used for debagging of a computer program executed by the main processor 140 and collection of an operation log of the HMD 100. Various forms can be adopted as the external connector 184. As the external connector 184, for example, interfaces adapted to wired connection such as a USB interface, a micro USB interface, and an interface for memory card and interfaces adapted to wireless connection such as a wireless LAN interface and a Bluetooth interface can be adopted.

The external memory interface 186 is an interface to which a portable memory device is connectable. The external memory interface 186 includes, for example, a memory card slot, into which a card-type recording medium is inserted to enable reading of data, and an interface circuit. A size, a shape, a standard, and the like of the card-type recording medium can be selected as appropriate. The USB connector 188 is an interface to which a memory device, a smartphone, a personal computer, and the like confirming to the USB standard are connectable.

The USB connector 188 includes, for example, a connector conforming to the USB standard and an interface circuit. A size and a shape of the USB connector 188, aversion of the USB standard, and the like can be selected as appropriate.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196. The interface 196 is connected to the right display unit 22 and the left display unit 24 of the image display section 20. In an example in this embodiment, the connection cable 40 (FIG. 1) is connected to the left holding section 23. A wire connected to the connection cable 40 is laid inside the image display section 20. Each of the right display unit 22 and the left display unit 24 is connected to the interface 196 of the control device 10.

The HMD 100 includes a vibrator 19. The vibrator 19 includes a not-shown motor and a not-shown eccentric rotor. The vibrator 19 generates vibration according to the control by the main processor 140. For example, when operation on the operation section 110 is detected or when the power supply of the HMD 100 is turned on and off, the HMD 100 generates vibration with the vibrator 19 in a predetermined vibration pattern.

The power supply section 130 includes a battery 132 and a power-supply control circuit 134. The power supply section 130 supplies electric power for the control device 10 to operate. The battery 132 is a chargeable battery. The power-supply control circuit 134 performs detection of a residual capacity of the battery 132 and control of charging to an OS 143. The power-supply control circuit 134 is connected to the main processor 140 and outputs a detection value of the residual capacity of the battery 132 or a detection value of a voltage of the battery 132 to the main processor 140. Note that the control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The right display unit 22 includes a display unit board 210, the OLED unit 221, the camera 61, an illuminance sensor 65, an LED indicator 67, and the temperature sensor 217. An interface (I/F) 211 connected to the interface 196, a receiving section (Rx) 213, and an EEPROM (Electrically Erasable Programmable Read-Only Memory) 215 are mounted on the display unit board 210. The receiving section 213 receives data input from the control device 10 via the interface 211. When receiving image data of an image displayed on the OLED unit 221, the receiving section 213 outputs the received image data to the OLED driving circuit 225 (FIG. 2).

The EEPROM 215 stores various data in a form readable by the main processor 140. The EEPROM 215 stores, for example, data concerning a light emission characteristic and a display characteristic of the OLED units 221 and 241 of the image display section 20 and data concerning characteristics of the sensors of the right display unit 22 or the left display unit 24. Specifically, the EEPROM 215 stores, for example, parameters related to gamma correction of the OLED units 221 and 241, data for compensating for detection values of the temperature sensors 217 and 239 explained below, and the like. These data are generated by a test during factory shipment of the HMD 100 and written in the EEPROM 215. After the shipment, the main processor 140 reads the data in the EEPROM 215 and uses the data for various kinds of processing.

The camera 61 executes imaging according to a signal input via the interface 211 and outputs captured image data or a signal indicating an imaging result to the control device 10. As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity). As shown in FIG. 1, the LED indicator 67 is disposed near the camera 61 at the end portion ER of the front frame 27. The LED indicator 67 is lit during execution of imaging by the camera 61 to inform that the imaging is being performed.

The temperature sensor 217 detects temperature and outputs a voltage value or a resistance value corresponding to the detected temperature. The temperature sensor 217 is mounted on the rear surface side of the OLED panel 223 (FIG. 3). The temperature sensor 217 may be mounted on, for example, the same substrate as the OLED driving circuit 225. With this configuration, the temperature sensor 217 mainly detects the temperature of the OLED panel 223. Note that the temperature sensor 217 may be incorporated in the OLED panel 223 or the OLED driving circuit 225. For example, when the OLED panel 223 functioning as an Si-OLED is mounted as an integrated circuit on an integrated semiconductor chip together with the OLED driving circuit 225, the temperature sensor 217 may be mounted on the semiconductor chip.

The left display unit 24 includes a display unit board 230, the OLED unit 241, and the temperature sensor 239. An interface (I/F) 231 connected to the interface 196, a receiving section (Rx) 233, a six-axis sensor 235, and a magnetic sensor 237 are mounted on the display unit board 230. The receiving section 233 receives data input from the control device 10 via the interface 231. When receiving image data of an image displayed on the OLED unit 241, the receiving section 233 outputs the received image data to the OLED driving circuit 245 (FIG. 2).

The six-axis sensor 235 is a motion sensor (an inertial sensor) including a three-axis acceleration sensor and a three-axis gyro (angular velocity) sensor. As the six-axis sensor 235, an IMU sensor obtained by modularizing the sensors may be adopted. The magnetic sensor 237 is, for example, a three-axis terrestrial magnetism sensor. The six-axis sensor 235 and the magnetic sensor 237 are provided in the image display section 20. Therefore, when the image display section 20 is worn on the head of the user, the six-axis sensor 235 and the magnetic sensor 237 detect a movement of the head of the user. The direction of the image display section 20, that is, the visual field of the user is specified from the detected movement of the head.

The temperature sensor 239 detects temperature and outputs a voltage value or a resistance value corresponding to the detected temperature. The temperature sensor 239 is mounted on the rear surface side of the OLED panel 243 (FIG. 3). The temperature sensor 239 may be mounted on, for example, the same substrate as the OLED driving circuit 245. With this configuration, the temperature sensor 239 mainly detects the temperature of the OLED panel 243. The temperature sensor 239 may be incorporated in the OLED panel 243 or the OLED driving circuit 245. Details of the temperature sensor 239 are the same as the details of the temperature sensor 217.

The camera 61, the illuminance sensor 65, and the temperature sensor 217 of the right display unit 22 and the six-axis sensor 235, the magnetic sensor 237, and the temperature sensor 239 of the left display unit 24 are connected to the sensor hub 192 of the control device 10. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a cache function of temporarily retaining the detection values of the sensors. The sensor hub 192 may include a conversion function for a signal format and a data format of the detection values of the sensors (e.g., a conversion function into a unified format).

The FPGA 194 starts and stops energization to the LED indicator 67 according to the control by the main processor 140 to light or extinguish the LED indicator 67.

FIG. 6 is a block diagram functionally showing the configuration of the control device 10. The control device 10 functionally includes a storage function section 122 and the control function section 150. The storage function section 122 is a logical storing section configured by the nonvolatile storing section 121 (FIG. 5). As the storage function section 122, instead of a configuration in which only the storage function section 122 is used, a configuration may be adopted in which the EEPROM 215 and the memory 118 are used in combination with the nonvolatile storing section 121. The main processor 140 executes a computer program, that is, hardware and software cooperate, whereby the control function section 150 is configured.

Various data served for processing in the control function section 150 are stored in the storage function section 122. Specifically, setting data 123, content data 124, and cursor image data 125 are stored in the storage function section 122 in this embodiment. The setting data 123 includes various setting values related to the operation of the HMD 100. For example, the setting data 123 includes parameters, a determinant, an arithmetic expression, an LUT (Look UP Table), and the like at the time when the control function section 150 controls the HMD 100.

The content data 124 includes data (image data, video data, sound data, etc.) of contents including images and videos displayed by the image display section 20 according to the control by the control function section 150. As the image data and the video data, there area 2D (two-dimensional) image data and video data and 3D (three-dimensional) image data and video data. In the following explanation, the 2D image data and video data are referred to as "2D content" and the 3D image data and video data are referred to as "3D content". That is, the content data 124 includes a 2D content 124a and a 3D content 124b.

In this embodiment, as a file format of the 3D content, a "side-by-side system" and a "top-and-bottom system" are adopted. The "side-by-side system" is a system in which one frame is configured by arranging, side by side on the left and the right, image data for left eye and image data for right eye laterally compressed to a half. In reproduction, the image data for left eye and the image data for right eye are respectively laterally expanded to a double and converted into video display data for left eye and video display data for right eye having a parallax to be three-dimensionally displayed. The "top-and-bottom system" is a system in which a compressing direction is changed to a longitudinal direction from the compressing direction in the "side-by-side system". Image data for left eye and image data for right eye are vertically arranged. The 3D content 124b is equivalent the "3D image data" in the aspect of the invention described in the summary. The storage function section 122 is equivalent to the "3D-image-data storing section" in the aspect of the invention described in the summary.

The cursor image data 125 is image data indicating a cursor. The cursor is an icon displayed on a screen of the image display section 20 and indicating an input position on the screen. In this embodiment, the cursor is formed in a shape of an arrow (see a cursor CS shown in FIG. 7). The touch pad 14 and the direction key 16 of the control device 10 (FIG. 1) are operated by the user, whereby the cursor moves on the screen. The cursor is equivalent to the "UI element" in the aspect of the invention described in the summary.

The control function section 150 executes various kinds of processing using the data stored by the storage function section 122 to thereby execute functions of the OS 143, an image processing section 145, a display control section 147, an imaging control section 149, an input/output control section 151, and a communication control section 153. In this embodiment, the functional sections other than the OS 143 are configured as computer programs executed on the OS 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like. Besides being realized by the main processor 140 executing the computer program, the image processing section 145 may be configured by hardware (e.g., a DSP (Digital Signal Processor)) separate from the main processor 140.

Note that the image processing section 145 may execute resolution conversion processing, image adjustment processing, 3D image processing, and the like according to necessity. The resolution conversion processing is processing for converting resolution of image data into resolution suitable for the right display unit 22 and the left display unit 24. The image adjustment processing is processing for adjusting luminance and chroma of the image data. The 3D image processing is processing for, when a file format of a 3D content is the "side-by-side system", expanding image data for left eye and image data for right eye included in the 3D content respectively to a double in the lateral direction and converting the image data for left eye and the image data for right eye into video display data for left eye and video display data for right eye having a parallax. When the file format of the 3D content is the "top-and-bottom system", the 3D image processing is processing for expanding the image data for left eye and the image data for right eye included in the 3D content respectively to a double in the longitudinal direction and converting the image data for left eye and the image data for right eye into video display data for left eye and video display data for right eye having a parallax. When executing these kinds of processing, the image processing section 145 generates a signal for displaying an image on the basis of the image data after the processing and transmits the signal to the image display section 20 via the connection cable 40.

The display control section 147 generates a control signal for controlling the right display unit 22 and the left display unit 24 and controls, with the control signal, generation and emission of image lights respectively by the right display unit 22 and the left display unit 24. Specifically, the display control section 147 controls the OLED driving circuits 225 and 245 to cause the OLED panels 223 and 243 to execute display of images. The display control section 147 performs, on the basis of signals output by the image processing section 145, for example, control of timing when the OLED driving circuits 225 and 245 perform drawing on the OLED panels 223 and 243 and control of the luminance of the OLED panels 223 and 243. The display control section 147 controls the right display unit 22 on the basis of the video display data for right eye output by the image processing section 145 and controls the left display unit 24 on the basis of the video display data for left eye output by the image processing section 145.

The imaging control section 149 controls the camera 61 to execute imaging, generates captured image data, and causes the storage function section 122 to temporarily store the captured image data. When the camera 61 is configured as a camera unit including a circuit that generates captured image data, the imaging control section 149 acquires the captured image data from the camera 61 and causes the storage function section 122 to temporarily store the captured image data.

The input/output control section 151 controls the touch pad 14 (FIG. 1), the direction key 16, and the determination key 17 as appropriate and acquires input commands from the touch pad 14, the direction key 16, and the determination key 17. The acquired commands are output to the OS 143 or a computer program operating on the OS 143 together with the OS 143. The OS 143 or the computer program operating on the OS 143 moves, on the basis of the input commands, the cursor displayed on the screen of the image display section 20. The communication control section 153 controls the wireless communication section 117 to perform wireless communication between the communication control section 153 and an external apparatus.

A-2. An Example of Augmented Reality Display

Figure 7:
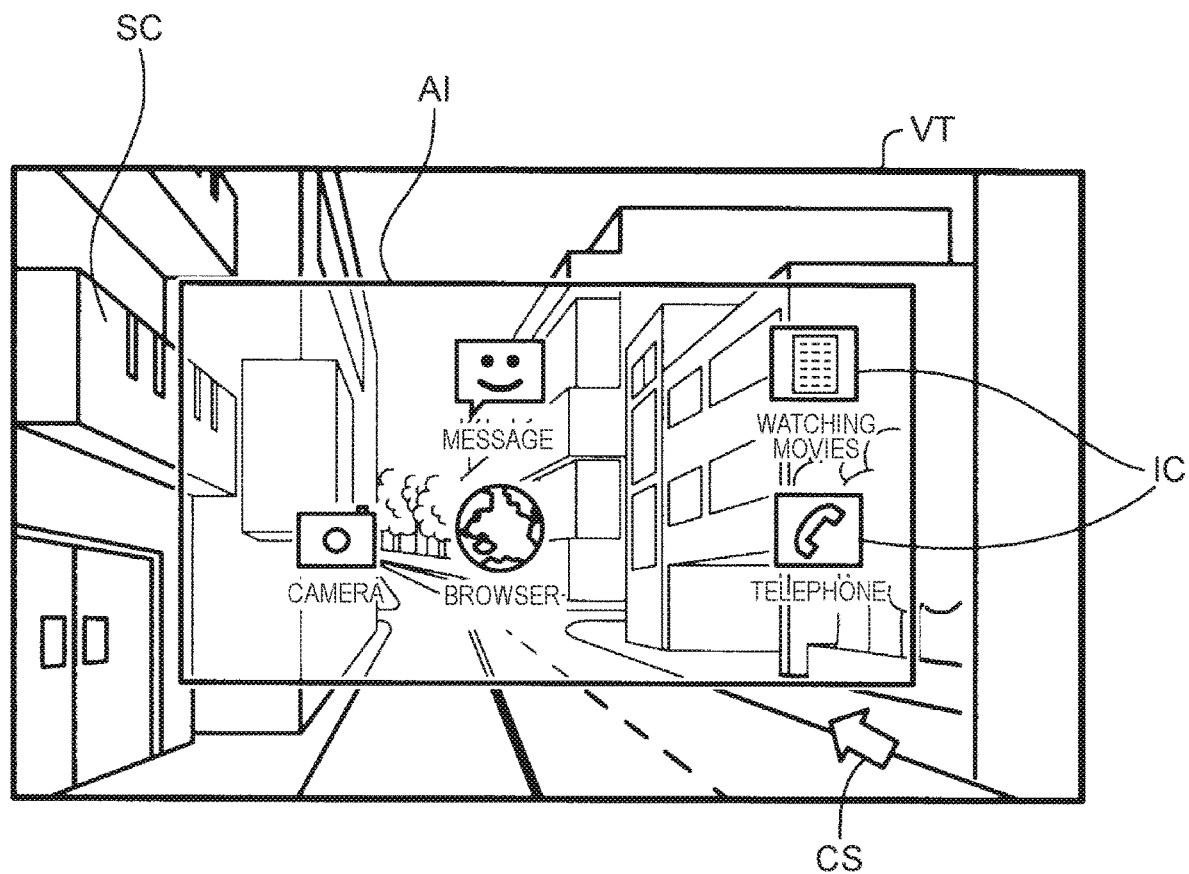
FIG. 7 is an explanatory diagram showing an example of augmented reality display by the HMD.

FIG. 7 is an explanatory diagram showing an example of augmented reality display by the HMD 100. In FIG. 7, a visual field VT of the user is illustrated. As explained above, the image lights guided to both the eyes of the user of the HMD 100 are focused on the retinas of the user, whereby the user visually recognizes an image AI serving as the augmented reality (AR). In the example shown in FIG. 7, the image AI is a menu screen of an OS of the HMD 100. The menu screen includes, for example, icons IC for starting application programs of "message", "telephone", "camera", "browser", and "watching movies". The right and left light guide plates 26 and 28 transmit lights from an outside scene SC, whereby the user visually recognizes the outside scene SC. In this way, concerning a portion where an image VI is displayed in the visual field VT, the user of the HMD 100 can view the image AI as overlapping the outside scene SC. Concerning a portion where the image AI is not displayed in the visual field VT, the user can view only the outside scene SC.

In the visual field VT, the user can visually recognize the cursor CS for pointing the icons IC. As explained above, the touch pad 14 and the direction key 16 of the control device 10 (FIG. 1) are operated, whereby the cursor CS moves on the screen. The "screen" is equivalent to the entire visual field VT visually recognized through the image display section 20. That is, the cursor CS can move in a range of the entire visual field VT visually recognized through the image display section 20.

A-3. The Principle of 3D Display

Figure 8:
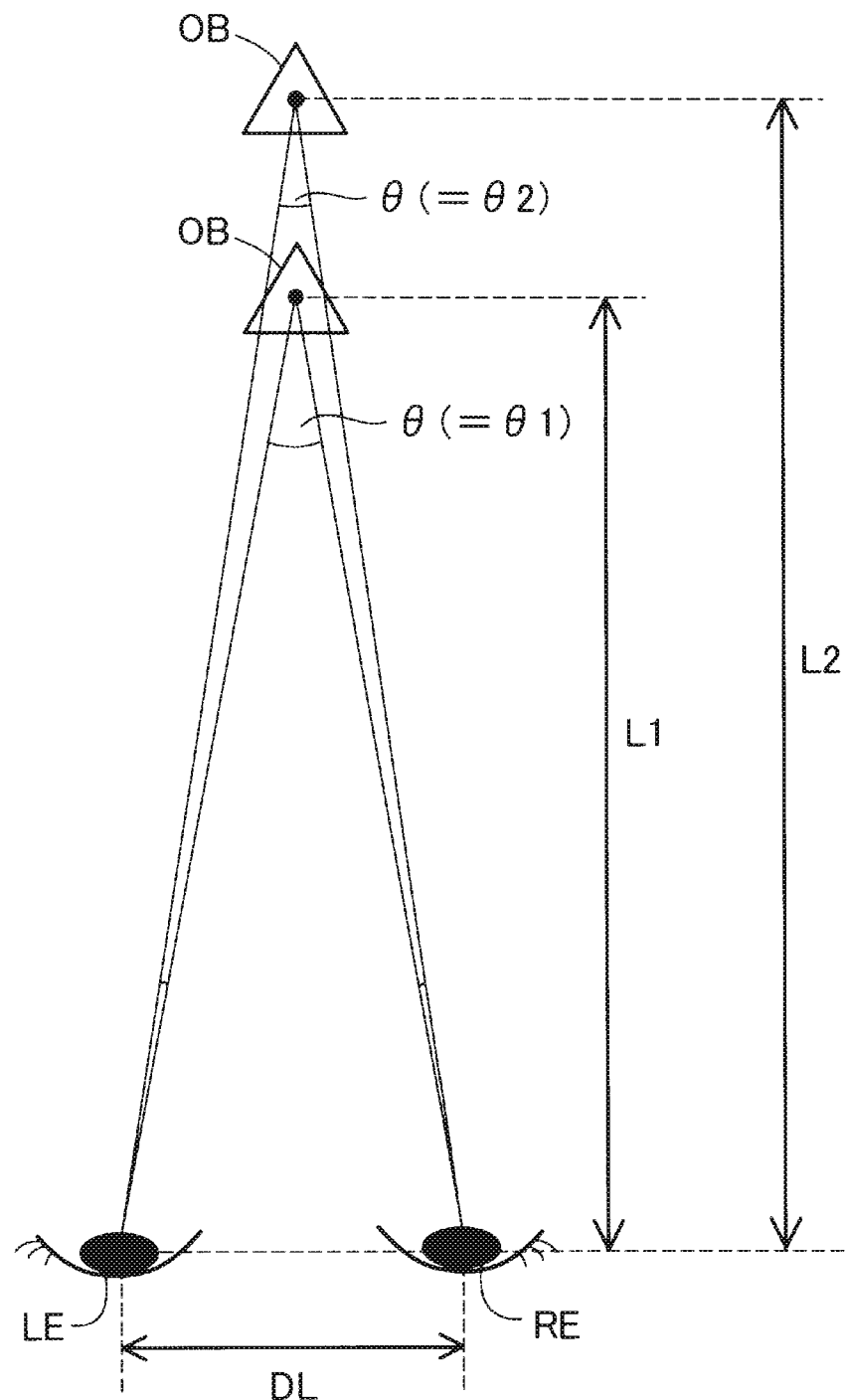
FIG. 8 is an explanatory diagram showing the principle of 3D display.

FIG. 8 is an explanatory diagram showing the principle of 3D display. When the human views the object OB with both the eyes LE and RE, the human views slightly different images with the left eye LE and the right eye RE. This is because the human eyes are apart by approximately DL (e.g., 65 mm) on the left and the right and images reflected on the left and right eyes LE and RE are different. The difference between the images seen by the left and the right eyes LE and RE is referred to as parallax. The direction of the eyes is different when the human views an object close to the eyes and when the human views a distance. An angle θ formed at this point is referred to as angle of convergence. When objects are present in front of the human, the angle of convergence θ is large (e.g., θ1) when the human views an object close to the human (e.g., a distance L1) and the angle of convergence θ is small (e.g., θ2) when the human views an object far from the human (e.g., a distance L2). When converting the images into one image in the brain according to the parallax, the human recognizes a distance such as depth and feels a cubic effect. In the 3D content 124b (FIG. 6), since videos corresponding to the left and right eyes LE and RE are respectively created to form the parallax, even if the videos are projected as plane images, it is possible to feel a cubic effect when viewing the plane images.

A-4. An Example of 3D Video Display

Figure 9:
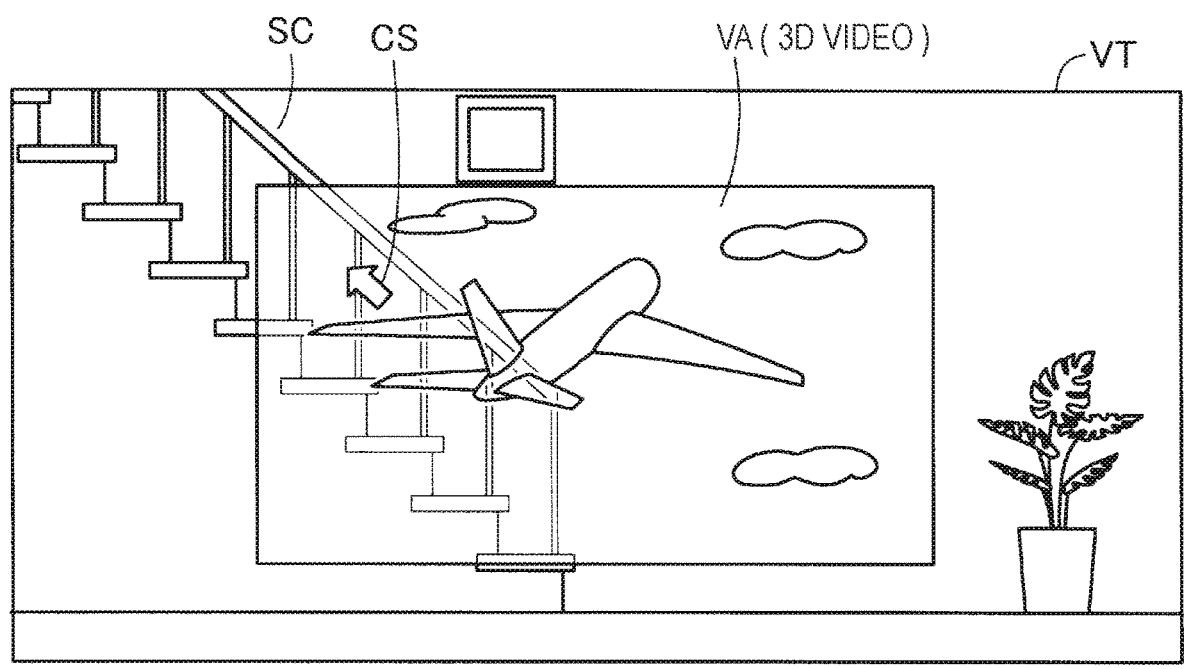
FIG. 9 is an explanatory diagram showing an example of 3D video display by the HMD.

FIG. 9 is an explanatory diagram showing an example of 3D video display by the HMD 100. In FIG. 9, the visual field VT of the user is illustrated. The user visually recognizes a video screen VA serving as augmented reality (AR). The user can also visually recognize the outside scene (e.g., the inside of a room) SC.

The user points the icon IC (FIG. 7) of "watching movies" to thereby start an application program of "watching movies" and designates a file format of the 3D content 124b from the application. For example, when the 3D content 124b to be reproduced is a 3D content of the side-by-side system, the user designates the side-by-side system as the file format. Then, the user reproduces the 3D content 124b, whereby the image display section 20 displays a video of the 3D content 124b on the video screen VA. The "video screen" is a region set in the screen of the image display section 20 and is a region for display for displaying the 3D content 124b. In the visual field VT, the user can visually recognize the cursor CS for pointing the icons IC. The cursor CS is sometimes superimposed and displayed on the video screen VA.

A-5. 3D Image Processing

Figure 10:
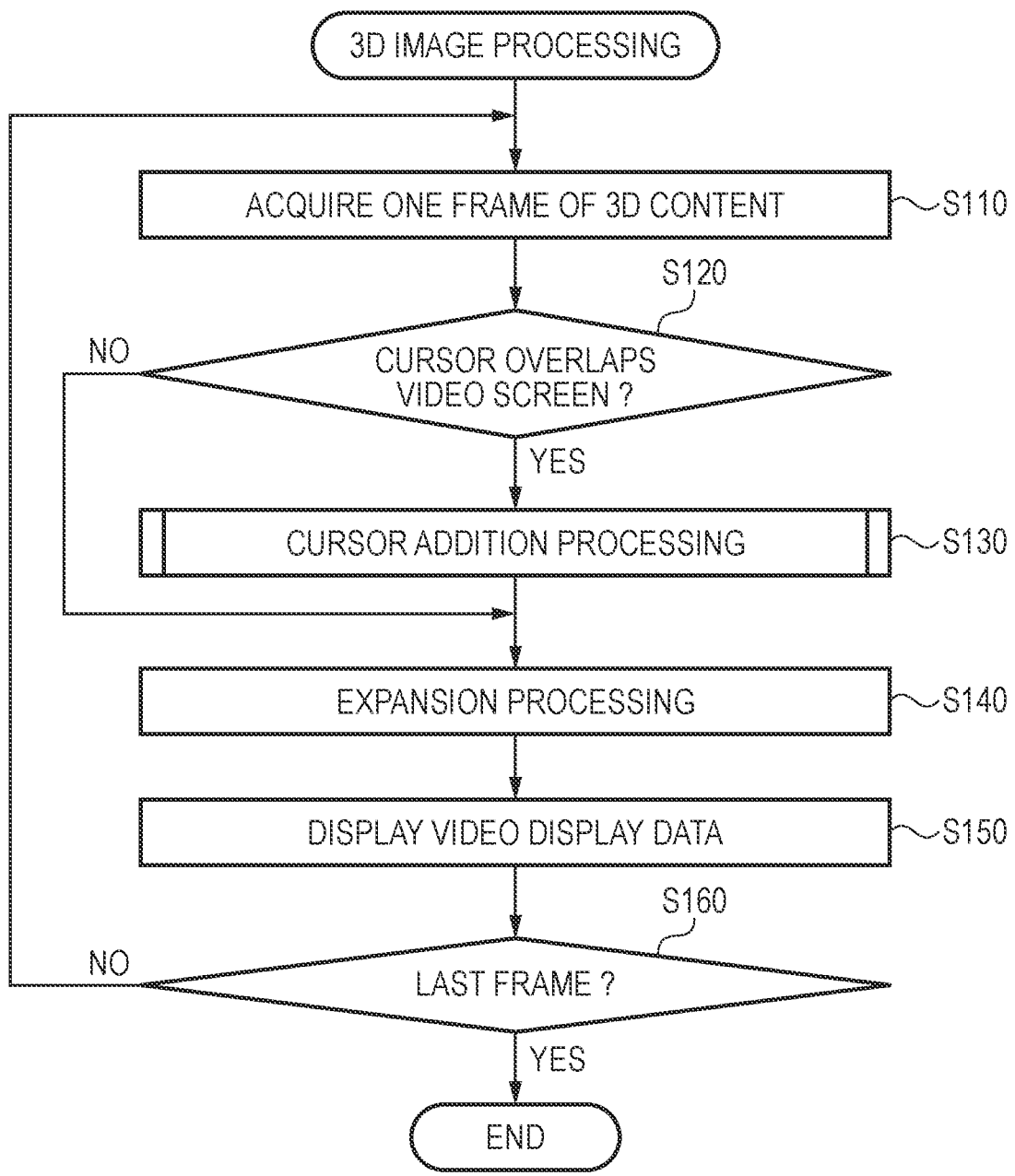
FIG. 10 is a flowchart for explaining 3D image processing.

FIG. 10 is a flowchart for explaining 3D image processing. The 3D image processing corresponds to the 3D image processing of the image processing section 145 shown in FIG. 6. The 3D image processing is executed by the main processor 140 of the HMD 100. When the icon IC of "watching movies" of the menu screen illustrated in FIG. 7 is pointed by the direction key 16 (FIG. 1) and the determination key 17 (FIG. 1) and, thereafter, an instruction for reproducing the 3D content 124b is performed in the started application program of "watching movies", execution of the 3D image processing is started.

When the processing is started, first, the main processor 140 of the HMD 100 acquires one frame from the 3D content 124b stored in the storage function section 122 (FIG. 6) (step S110).

Figure 11:
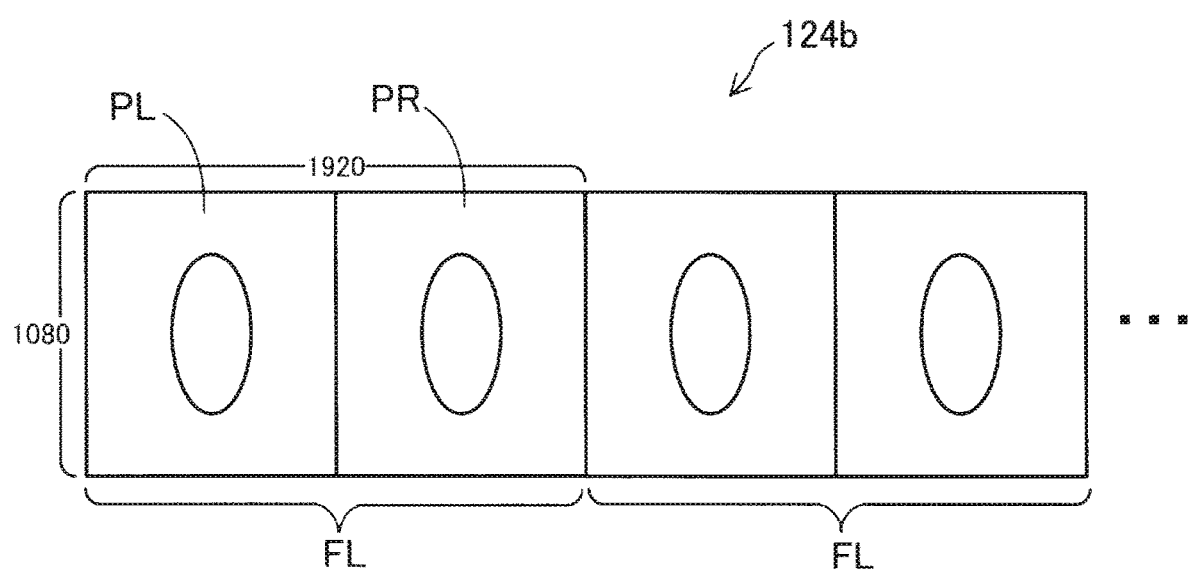
FIG. 11 is an explanatory diagram showing a data configuration of a 3D content.

FIG. 11 is an explanatory diagram showing a data configuration of the 3D content 124b. In the 3D content 124b shown in the figure, the file format is the "side-by-side system". When the 3D content 124b is a moving image, the 3D content 124b includes a plurality of frames FL equivalent to one segment. The frames FL have a configuration in which image data for left eye PL and image data for right eye PR having a parallax are arranged on the left and the right. Each of the image data for left eye PL and the image data for right eye PR is obtained by laterally compressing original image data (e.g., 1920 pixels×1080 pixels) to a half. In step S110 in FIG. 10, one frame is acquired from the 3D content 124b having such a configuration.

Subsequently, the main processor 140 captures detection signals of the touch pad 14 and the direction key 16 and determines whether a designated position of the cursor CS designated by the touch pad 14 and the direction key 16 overlaps the video screen VA (step S120). The video screen VA is a region for display for displaying the 3D content 124b illustrated in FIG. 9. When it is determined that the cursor CS overlaps the video screen VA, the main processor 140 advances the processing to step S130.

In step S130, the main processor 140 executes cursor addition processing for adding the cursor CS to the video screen VA.

Figure 12:
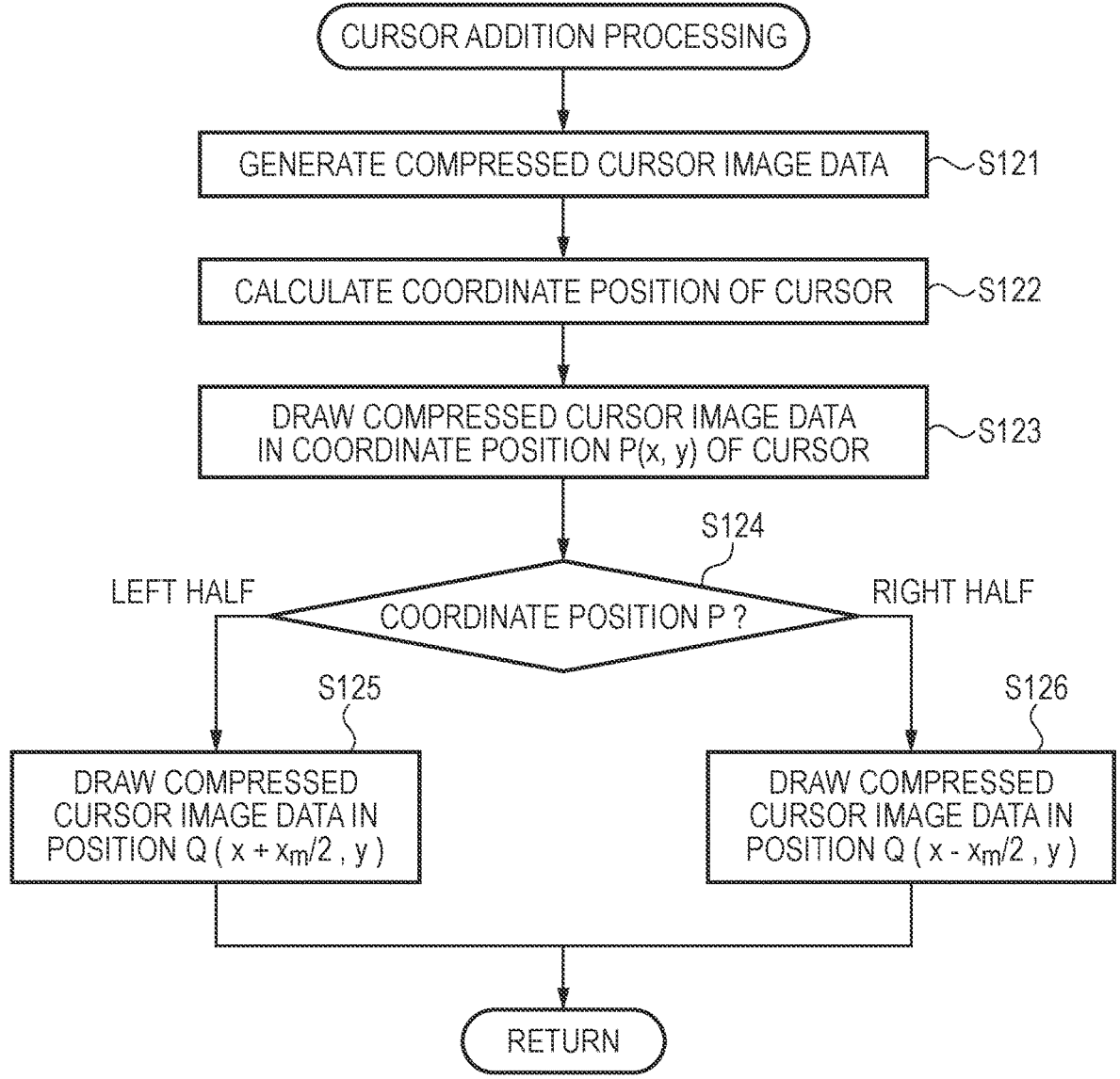
FIG. 12 is a flowchart for explaining details of cursor addition processing.

FIG. 12 is a flowchart for explaining details of the cursor addition processing. The processing shifts to the cursor addition processing, the main processor 140 acquires the cursor image data 125 from the storage function section 122 (FIG. 6) and generates compressed cursor image data from the acquired cursor image data 125 (step S121).

Figure 13A:
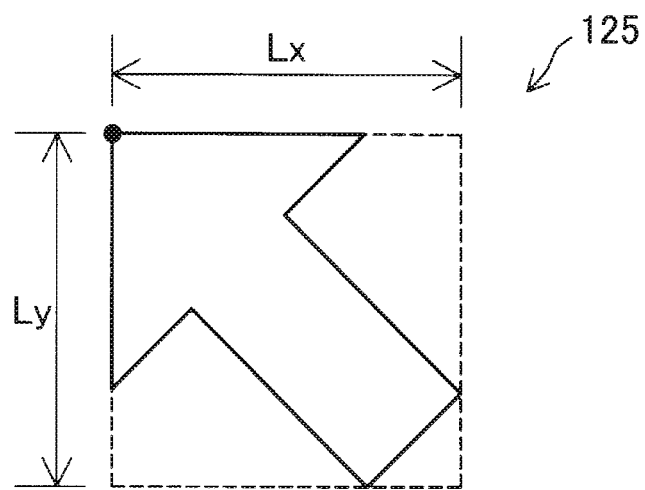
FIG. 13A is an explanatory diagram showing cursor image data.
Figure 13B:
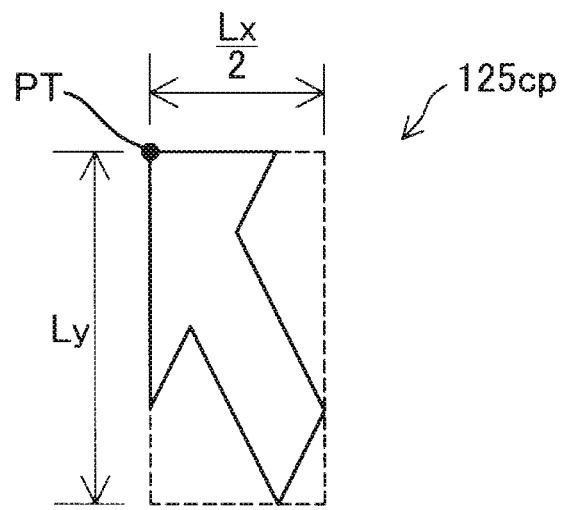
FIG. 13B is an explanatory diagram showing compressed cursor image data.

FIG. 13A is an explanatory diagram showing the cursor image data 125. FIG. 13B is an explanatory diagram showing compressed cursor image data 125*cp*. As shown in FIG. 13A, the cursor image data 125 is data indicating a rectangular image, the dimension in the lateral direction of which is Lx and the dimension in the longitudinal direction of which is Ly. In this embodiment, the rectangular image represents a left upward arrow. A unit of the dimensions is the number of pixels. Lx and Ly are positive integers.

In step S121 in FIG. 12, processing for compressing the dimension in the lateral direction to a half is applied to the cursor image data 125 having the configuration explained above. As a result of the compression processing, as shown in FIG. 13B, the compressed cursor image data 125*cp*, the dimension in the lateral direction of which is Lx/2 and the dimension in the longitudinal direction of which is still Ly, is generated.

As shown in FIG. 12, subsequently, the main processor 140 captures detection signals of the touch pad 14 and the direction key 16 and calculates a coordinate position of the cursor CS in the video screen VA (step S122). The "coordinate position" is a relative position in the video screen VA.

Figure 14:
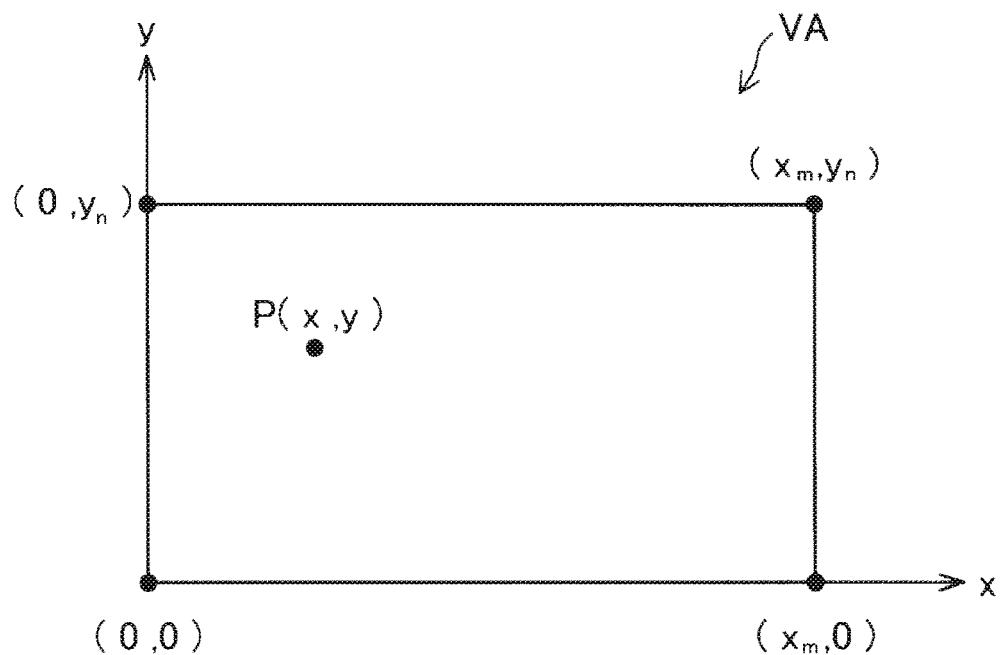
FIG. 14 is an explanatory diagram showing a coordinate position of a cursor.

FIG. 14 is an explanatory diagram showing a coordinate position of the cursor CS. As shown in the figure, a coordinate system, the x axis of which is the lateral direction of the video screen VA and the y axis of which is the longitudinal direction of the video screen VA, is set. A coordinate position P(x, y) of the cursor CS is indicated by a coordinate value. One unit of the x axis and the y axis is one pixel. A coordinate value at the lower left corner of the video screen VA is (0, 0), a coordinate value at the lower right corner is (xm, 0), a coordinate value of the upper right corner is (xm, yn), and a coordinate value of the upper left corner is (0, yn).

In step S122, the coordinate position P (x, y) of the cursor CS is calculated according to the coordinate value in the coordinate system shown in FIG. 14. In step S120 in FIG. 10, it is determines that the coordinate position P (x, y) of the cursor CS overlaps the video screen VA. Therefore, the coordinate position P (x, y) calculated in step S122 fits within a range specified by (0, 0), (xm, 0), (xm, yn), and (0, yn).

After the execution of step S122 in FIG. 12, the main processor 140 performs processing for drawing the compressed cursor image data 125cp generated in step S121 on one frame of the 3D content 124b acquired in step S110 in FIG. 10 (step S123). Specifically, the main processor 140 performs, in one frame of the 3D content 124b, drawing of the compressed cursor image data 125cp in the coordinate position P (x, y) calculated in step S122. The drawing of the compressed cursor image data 125cp is performed such that a reference point PT (an upper right vertex; see FIG. 13B) of the compressed cursor image data 125cp overlaps the coordinate position P (x, y). The same applies in the following explanation.

Figure 15:
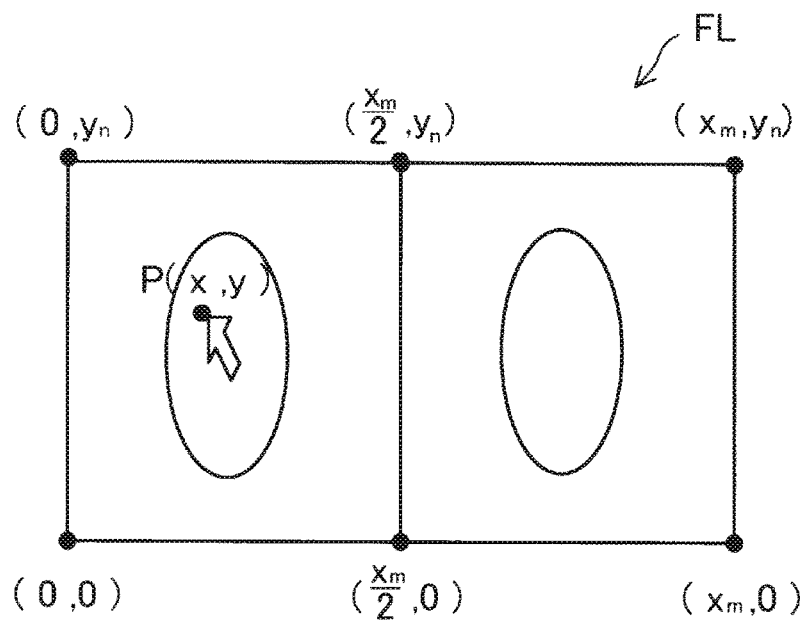
FIG. 15 is an explanatory diagram showing one frame after drawing in step S123.

FIG. 15 is an explanatory diagram showing one frame FL after the drawing in step S123. The compressed cursor image data 125cp compressed in the lateral direction is drawn in the coordinate position P (x, y) in the one frame FL of the 3D content 124b. More specifically, the compressed cursor image data 125cp is drawn such that the upper left corner of an image indicated by the compressed cursor image data 125cp overlaps the coordinate position P(x, y).

After the execution of step S123 in FIG. 12, the main processor 140 determines to which of the left half and the right half the coordinate position P (x, y) of the cursor CS calculated in step S122 corresponds in the one frame FL of the 3D content 124b (step S124). Specifically, the main processor 140 determines whether an x-coordinate value of the coordinate position P(x, y) is smaller than xm/2 to thereby determine whether the coordinate position P (x, y) corresponds to the left half or corresponds to the right half.

When determining in step S124 that the coordinate position P(x, y) corresponds to the left half, the main processor 140 performs processing for drawing another compressed cursor image data 125cp generated in step S121 on one frame of the 3D content 124b after the drawing in step S123 (step S125). Specifically, the main processor 140 performs drawing of the compressed cursor image data 125cp in a coordinate position Q (x+xm/2, y) calculated in step S122 in one frame of the 3D content 124b after the drawing in step S123.

Figure 16:
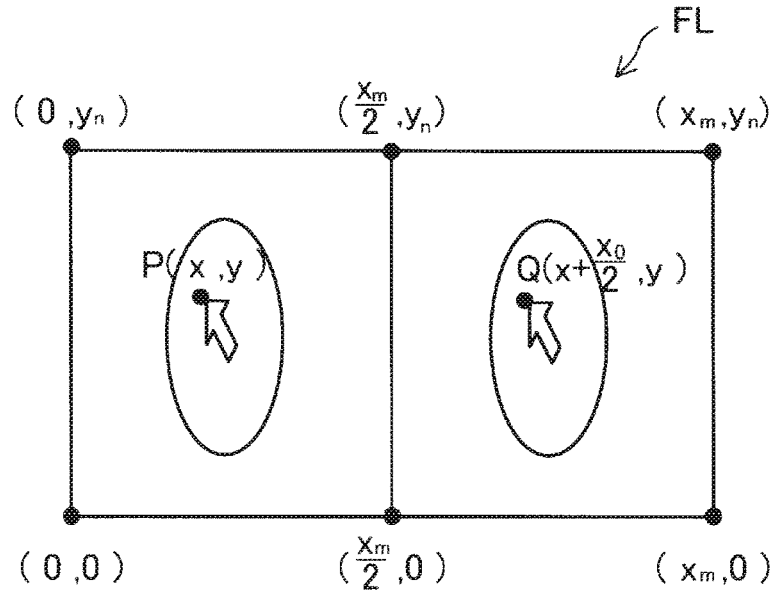
FIG. 16 is an explanatory diagram showing one frame after drawing in step S125.

FIG. 16 is an explanatory diagram showing the one frame FL after the drawing in step S125. In an image represented by the image data for right eye PR, the coordinate position Q(x+xm/2, y) indicates the same relative position as the coordinate position P(x, y) of the cursor CS in an image represented by the image data for left eye PL. The compressed cursor image data 125cp compressed in the lateral direction is drawn in the coordinate position Q(x+xm/2, y). Specifically, the compressed cursor image data 125cp is drawn such that the upper left corner of the image indicated by the compressed cursor image data 125cp overlaps the coordinate position Q(x+xm/2, y).

On the other hand, when determining in step S124 that the coordinate position P (x, y) corresponds to the right half, the main processor 140 performs processing for drawing another compressed cursor image data 125cp generated in step S121 on one frame of the 3D content 124b after the drawing in step S123 (step S126). Specifically, the main processor 140 performs drawing of the compressed cursor image data 125cp in a coordinate position Q(x−xm/2, y) calculated in step S122 in one frame of the 3D content 124b after the drawing in step S123.

Figure 17:
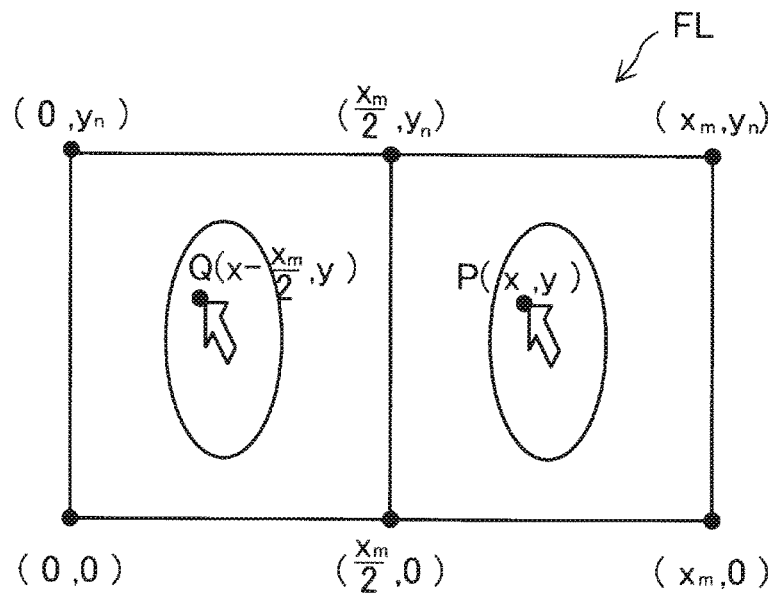
FIG. 17 is an explanatory diagram showing one frame after drawing in step S126.

FIG. 17 is an explanatory diagram showing the one frame FL after the drawing in step S126. In the image represented by the image data for left eye PL, the coordinate position Q(x−xm/2, y) indicates the same relative position as the coordinate position P of the cursor CS in the image represented by the image data for right eye PR. The compressed cursor image data 125cp compressed in the lateral direction is drawn in the coordinate position Q(x−xm/2/y). Specifically, the compressed cursor image data 125cp is drawn such that the upper left corner of the image indicated by the compressed cursor image data 125cp overlaps the coordinate position Q(x−xm/2, y).

The one frame FL shown in FIG. 16 on which a compressed cursor image is drawn when the coordinate position P(x, y) corresponds to the left half and the one frame FL shown in FIG. 17 on which a compressed cursor image is drawn when the coordinate position P(x, y) corresponds to the right half are the same image. That is, the processing in steps S123 to S126 is processing for drawing, in each of the image data for left eye PL and the image data for right eye PR, a compressed cursor image in the same relative position in images represented by the corresponding image data PL and PR. When the coordinate position P(x, y) corresponds to the left half and when the coordinate position P(x, y) corresponds to the right half, the same 3D content 124b after cursor addition is obtained.

After the execution of step S125 or step S126 in FIG. 12, the main processor 140 advances the processing to "return" and once ends this cursor addition processing. After ending the cursor addition processing, the main processor 140 advances the processing to step S140 in FIG. 10.

When determining in step S120 in FIG. 10 that the designated position of the cursor CS does not overlap the video screen VA, the main processor 140 advances the processing to step S140 without executing the cursor addition processing in step S130.

In step S140, the main processor 140 expands the image data for left eye PL and the image data for right eye PR included in the one frame FL of the 3D content 124b respectively to a double in the lateral direction and converts the image data for left eye PL and the image data for right eye PR into video display data for left eye and video display data for right eye having a parallax. When the designated position of the cursor CS overlaps the video screen VA, the image data for left eye PL and the image data for right eye PR are image data after addition of the compressed cursor image. The expansion processing is well-known processing performed when a 3D content of the "side-by-side system" is reproduced.

Figure 18:
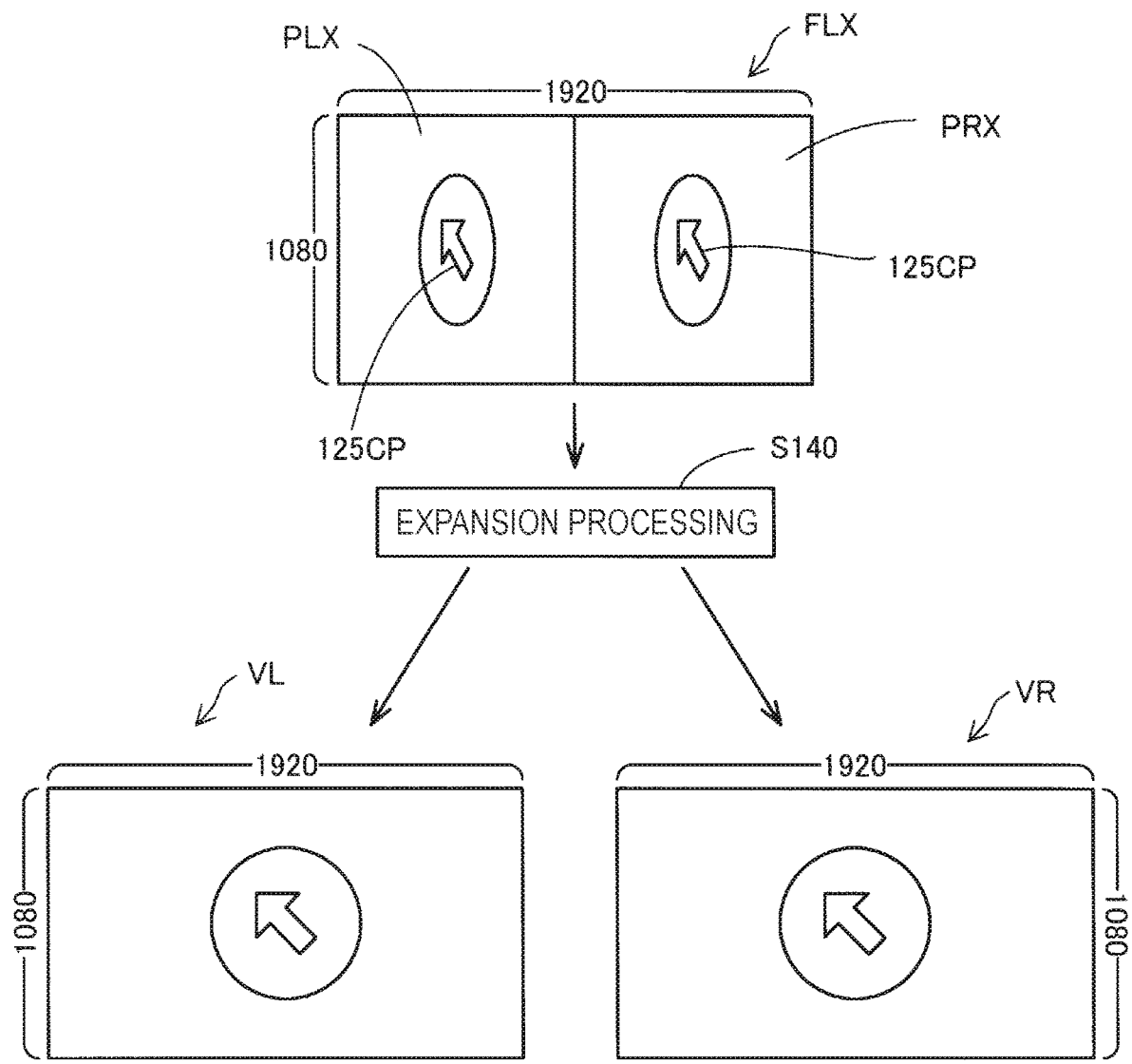
FIG. 18 is an explanatory diagram showing video display data for left eye and video display data for right eye obtained by expansion processing.

FIG. 18 is an explanatory diagram showing video display data for left eye VL and video display data for right eye VR obtained by the expansion processing. FLX in the figure indicates a frame after the drawing of the compressed cursor image data 125cp in step S125 or step S126. The compressed cursor image data 125cp are respectively drawn on image data for left eye PLX and image data for right eye PRX included in the frame FLX before the addition of the expansion processing. As a result of the expansion processing in step S140 in FIG. 10, the image data for left eye PLX is expanded to a double in the lateral direction to be the video display data for left eye VL. Similarly, the image data for right eye PRX is expanded to a double in the lateral direction to be the video display data for right eye VR. A cursor image included in an image of the video display data for left eye VL and a cursor image included in an image of the video display data for left eye VL have an uncompressed original shape. Display positions of the respective cursors CS are the same relative position in the images of the corresponding video display data.

Subsequently, the main processor 140 performs processing for causing the image display section 20 to display the video display data for left eye VL and the video display data for right eye VR obtained in step S140 (step S150). Specifically, the main processor 140 causes the left display unit 24 to display the video display data for left eye VL and causes the right display unit 242 to display the video display data for right eye VR.

Subsequently, the main processor 140 determines whether one frame acquired in step S110 is the last one frame in the 3D content 124b (step S160). When determining that the one frame is not the last one frame, the main processor 140 returns the processing to step S110 and performs the processing in steps S110 to S160 concerning the next one frame. On the other hand, when determining in step S160 that the one frame is the last one frame, assuming that reproduction of the 3D content 124b is completed, the main processor 140 ends the 3D image processing.

Note that, in step S123 and step S125 in FIG. 12, cursor partial hiding processing explained below is applied.

Figure 19A:
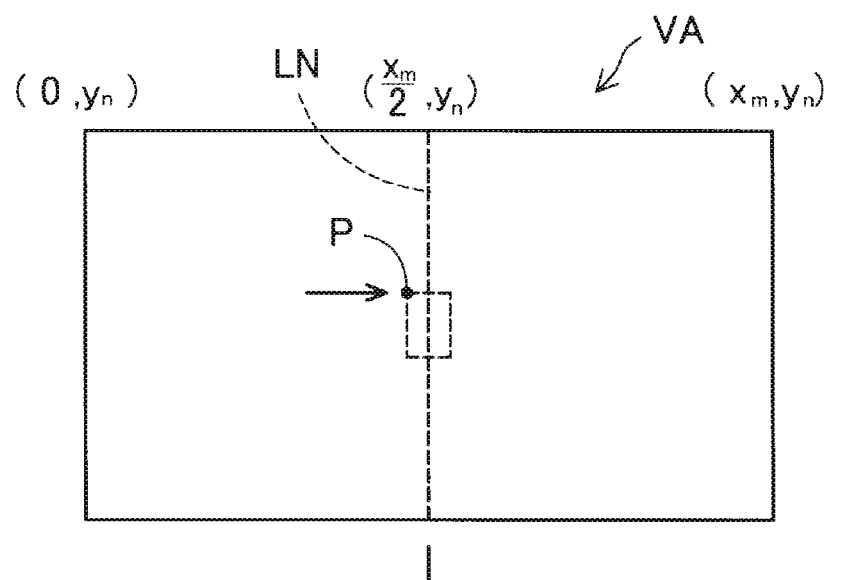
FIGS. 19A and 19B are explanatory diagrams showing a problem solved by cursor partial hiding processing.
Figure 19B:
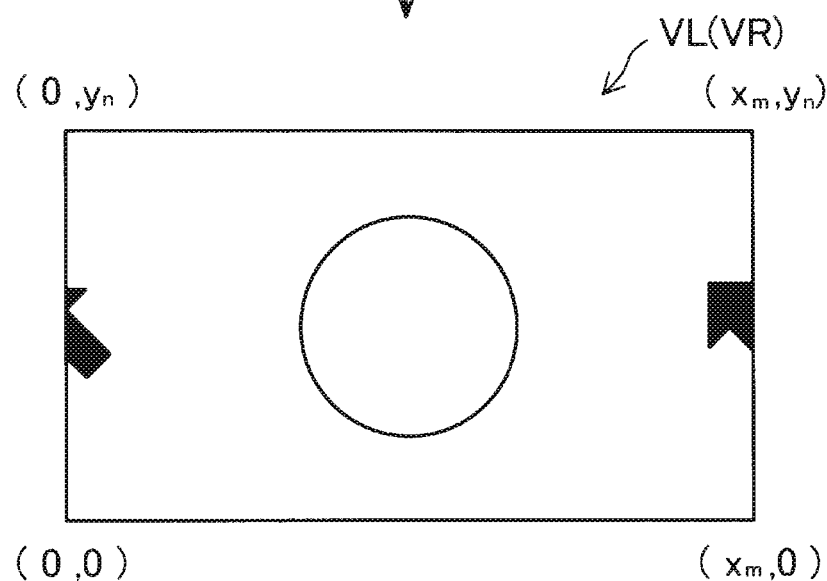

FIGS. 19A and 19B are explanatory diagrams showing a problem solved by the cursor partial hiding processing. As shown in FIG. 19A, it is assumed that, in the video screen VA, the coordinate position P(x, y) indicating a designated position of a cursor straddles across a boundary line LN between the left half and the right half from a position in the left half to a position in the right half. In this case, as shown in FIG. 19B, in the video display data for left eye VL and the video display data for right eye VR generated by the 3D image processing, in some case, a right side image C1 of the cursor is displayed at the left end and a left side image C2 of the cursor is displayed at the right end. Similarly, when the coordinate position P(x, y) straddles across the boundary line LN from a position in the right half to a position in the left half, in some case, partial images of the cursor are displayed on both sides of the left end and the right end. Processing for solving this problem is the cursor partial hiding processing explained below.

Figure 20A:
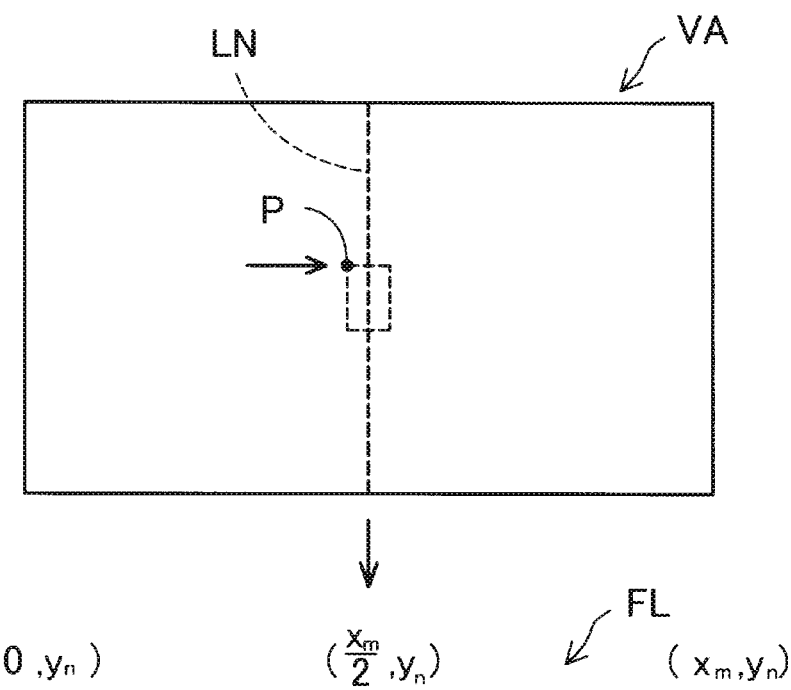
FIGS. 20A and 20B are explanatory diagrams showing an example of addition of a compressed cursor to a frame.
Figure 20B:
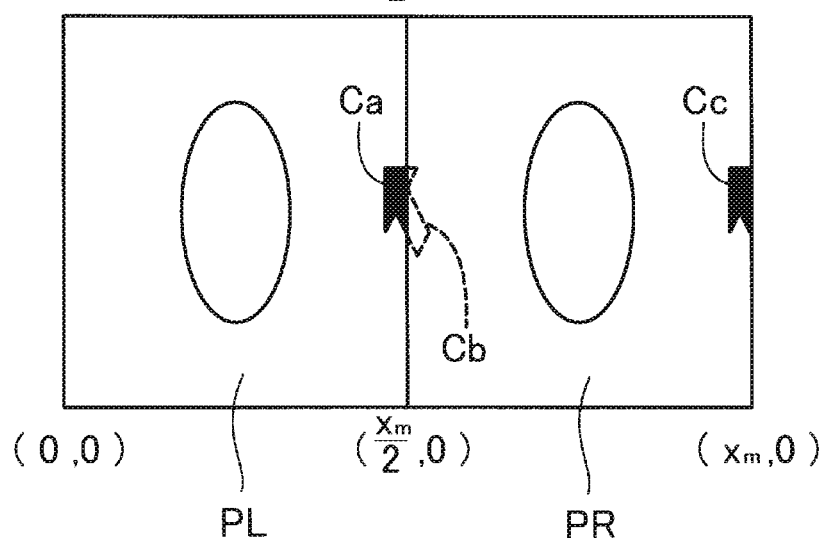

FIGS. 20A and 20B are explanatory diagrams showing an example of addition of a compressed cursor to the frame FL. In the video screen VA, when the coordinate position P(x, y) moves from the left side and is present in the left half and when a range in which the compressed cursor image data 125cp is drawn protrudes to the right half of the video screen VA as shown in FIG. 20A, as shown in FIG. 20B, when the compressed cursor image 125cp is drawn in step S123 (FIG. 12), a left portion Ca included in a range of the image data for left eye PL is drawn and a right portion Cb protruding from the range of the image data for left eye PL is not drawn. As shown in FIG. 20B, when the compressed cursor image data 125cp is drawn in step S125 (FIG. 12), only a left portion Cc included in a range of the image data for right eye PR is drawn.

Figure 21A:
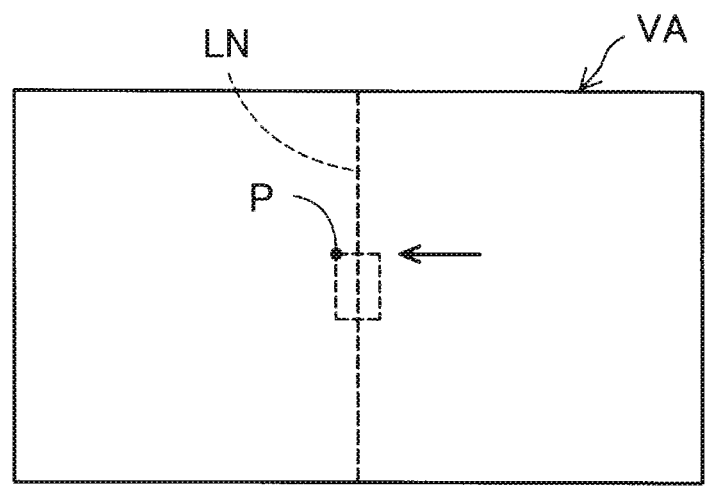
FIGS. 21A and 21B are explanatory diagrams showing another example of the addition of the compressed cursor to the frame.
Figure 21B:
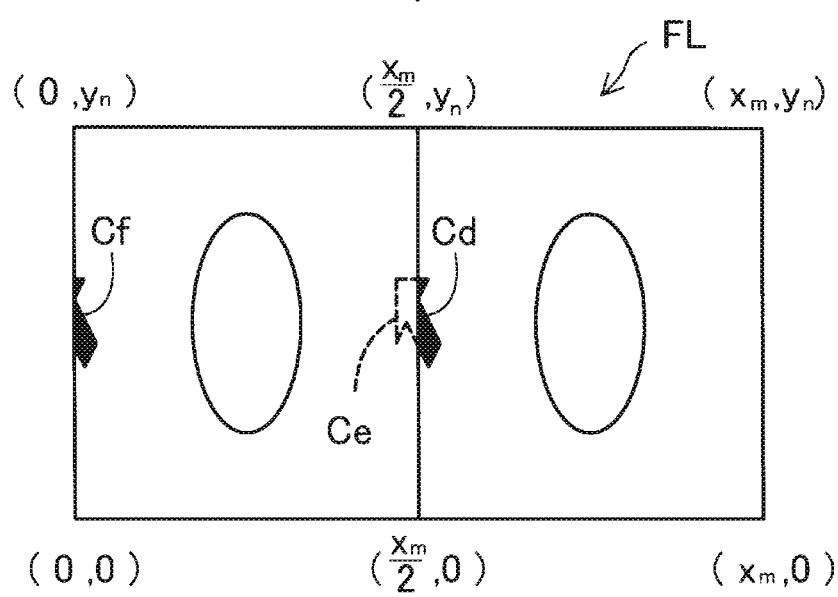

FIGS. 21A and 21B are explanatory diagrams showing another example of the addition of the compressed cursor to the frame FL. In the video screen VA, when the coordinate position P (x, y) moves from the right side and straddles across the boundary line LN and is present in the left half and when the range in which the compressed cursor image data 125cp is drawn protrudes to the right half of the video screen VA as shown in FIG. 21A, as shown in FIG. 21B, when the compressed cursor image 125cp is drawn in step S123, a right portion Cd included in the range of the image data for right eye PR is drawn and a left portion Ce protruding from the range of the image data for right eye PR is not drawn. As shown in FIG. 21B, when the compressed cursor image data 125cp is drawn in step S125, a right portion Cf protruding from the range of the image data for right eye PR is drawn on the image data for left eye PL.

That is, as the cursor partial hiding processing, in steps S123 and S125, when a drawing range of the compressed cursor straddles across the boundary line LN, the image data for left eye PL (or the image data for right eye PR) on a side where the coordinate position P of the compressed cursor is located first is preferentially drawn. The image data for right eye PR (or the image data for left eye PL) on the other side is not drawn. With such a configuration, when the drawing range of the compressed cursor straggles across the boundary line LN, it is possible to prevent the partial image of the cursor from being dividedly displayed on both the side at the left end and the right end as shown in FIG. 19B. Note that, instead of the configuration in which the side of the image data for left eye PL or the image data for right eye PR where the coordinate position P of the compressed cursor is first located is preferentially left, a configuration may be adopted in which a side where the image data for left eye PL or the image data for right eye PR is not first located is preferentially left.

A-6. Effects of the Embodiment

With the head-mounted display device 100 in the first embodiment configured as explained above, as explained with reference to FIG. 18, in the video display data for left eye VL and the video display data for right eye VR, the image of the cursor CS is drawn in the same relative position in the images of the display data VL and VR while keeping the uncompressed original shape. Therefore, when the cursor CS is superimposed and displayed on the 3D content, the user can operate the cursor CS with high operability. Therefore, with the display device in this embodiment, it is possible to improve the operability of the cursor CS.

B. Second Embodiment

In the first embodiment, the two compressed cursor image data 125cp are individually drawn on the one frame FL of the 3D content 124b. On the other hand, in the second embodiment, aggregate compressed cursor image data including two compressed cursors is prepared in advance and drawn on the frame FL. The other components are the same as the components in the first embodiment.

Figure 22:
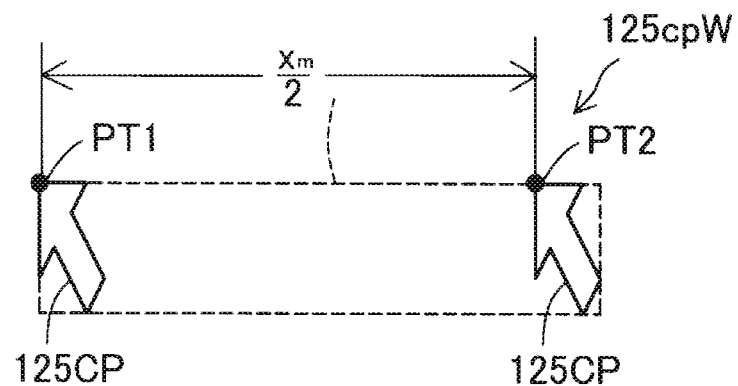
FIG. 22 is an explanatory diagram showing aggregate compressed cursor image data.

FIG. 22 is an explanatory diagram showing aggregate compressed cursor image data 125cpW. As shown in the figure, the aggregate compressed cursor image data 125cpW is image data indicating an image in which the two compressed cursor image data 125cp are disposed to be separated by a distance equal to a half of a lateral width xm of the one frame FL in the lateral direction. The distal ends of arrows of the compressed cursor image data 125cp are set as a first reference point PT1 and a second reference point PT2. When the coordinate position P(x, y) of the cursor CS is present in the left half, drawing of the aggregate compressed cursor image data 125cpW is performed to superimpose the first reference point PT1 on the left side on the coordinate position P(x, y). When the coordinate position P (x, y) of the cursor CS is present in the right half, drawing of the aggregate compressed cursor image data 125cpW is performed to superimpose the second reference point PT2 on the right side on the coordinate position P(x, y).

With the display device in the second embodiment configured as explained above, as in the first embodiment, in the video display data for left eye VL and the video display data for right eye VR, the image of the cursor CS is drawn in the same relative position in the images of the display data VL and VR while keeping the uncompressed original shape. Therefore, with the display device in the second embodiment, as in the first embodiment, it is possible to improve the operability of the UI element.

C. Third Embodiment

In the first embodiment and the second embodiment, as explained above, in the video display data for left eye VL and the video display data for right eye VR, the image of the cursor CS is drawn in the same relative position in the images of the display data VL and VR while keeping the uncompressed original shape. On the other hand, in a third embodiment, a parallax may be formed between an image of the cursor CS drawn on the video display data for left eye VL and an image of the cursor CS drawn on the video display data for right eye VR.

Figure 23:
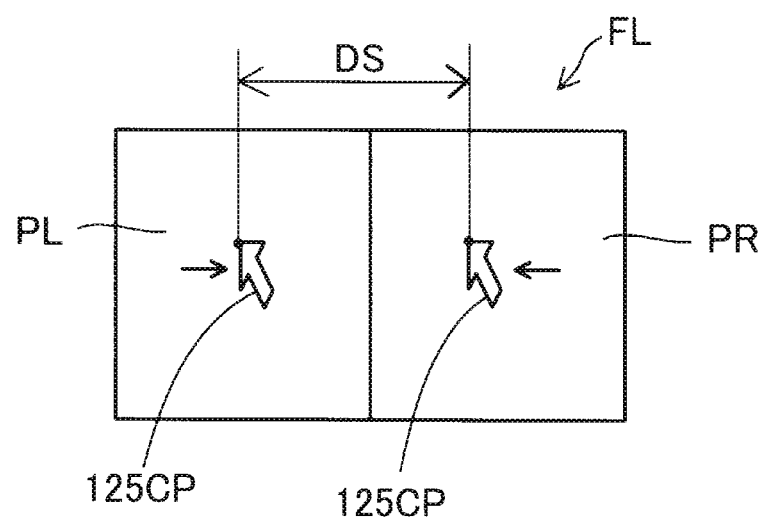
FIG. 23 is an explanatory diagram showing a specific configuration of a third embodiment.

FIG. 23 is an explanatory diagram showing a specific configuration in the third embodiment. As shown in FIG. 23, in the frame FL of the 3D content 124b, a distance DS between a position where the compressed cursor image data 125cp is drawn in step S123 in FIG. 12 and a position where the compressed cursor image data 125cp is drawn in step S125 or step S126 in FIG. 12 is set shorter than xm/2. Specifically, in step S123 in FIG. 12, a drawing position is set in a position moved by one pixel from the coordinate position P to the boundary line LN side, that is, in the right direction when the coordinate position P corresponds to the left half or in the left direction when the coordinate position P corresponds to the right half. In step S125 or step S126 in FIG. 12, the drawing position is set in a position moved by one pixel from the position Q to the boundary line LN side, that is, in the left direction when the coordinate position P corresponds to the left half or in the right direction when the coordinate position P corresponds to the right half.

With the configuration explained above, a parallax for causing a user to feel as if the cursor CS pops up forward is formed between an image of the cursor CS drawn on the video display data for left eye VL and an image of the cursor CS drawn on the video display data for right eye VR. With the display device in the third embodiment, it is possible to stereoscopically (three-dimensionally) display the cursor CS.

As a modification of the third embodiment, a configuration explained below may be adopted. In the third embodiment, the touch pad 14 and the direction key 16 of the control device 10 (FIG. 1) are operated by the user, whereby the cursor CS moves on the screen. On the other hand, as the modification, a configuration may be adopted in which, in a state in which the cursor CS is displayed on the screen of the image display section 20, the user holds out a fingertip to a space in front of the eyes, superimposes the fingertip on the displayed cursor CS, and moves the cursor CS in the space seen through the right light guide plate 26 and the left light guide plate 28. In this case, the distance to the fingertip is detected by the distance detecting section. A position where the compressed cursor image data 125cp is drawn in step S123 in FIG. 12 and a position where the compressed cursor image data 125cp is drawn in step S125 or step S126 are respectively decided according to the detected distance.

The distance detected by the distance detecting section is the distance from the HMD 100 to the fingertip in a direction that the user faces. When the distance is short, the position where the compressed cursor image data 125cp is drawn in step S123 and the position where the compressed cursor image data 125cp is drawn in step S125 or step S126 are respectively decided to be seen as popping up forward. When the distance is long, the positions are respectively decided to be seen as lying deep.

As the distance detecting section, well-known various components can be adopted. In this embodiment, the camera 61 (FIG. 1) is the stereo camera. The distance is detected using the triangulation on the basis of the direction of the image display section 20 (the direction of a line of sight of the user) detected by the six-axis sensor 235 and two images including an object (e.g., the fingertip) imaged by the camera 61. Besides, for example, a configuration can be adopted in which the distance to the object is detected by comparing the actual size of the object and the size of the object in a display image.

With the configuration of this modification, it is possible to adjust a pop-up feeling of the cursor CS according to the distance to the fingertip that operates the cursor. Therefore, it is possible to display the cursor CS in a field of view in which the finger is easily seen. It is possible to further improve the operability of the user. Note that, besides the fingertip, various objects such as a pen and a pointing rod can be used as the object for operating the cursor.

D. Modifications

Note that the invention is not limited to the first to third embodiments and the modifications of the first to third embodiments. The invention can be carried out in various forms without departing from the spirit of the invention. For example, modifications explained below are also possible.

Modification 1

Figure 24A:
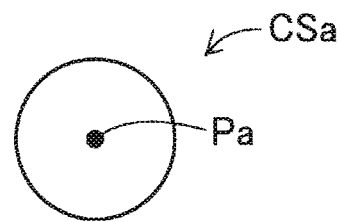
FIG. 24A is an explanatory diagram showing another shape of the cursor.
Figure 24B:
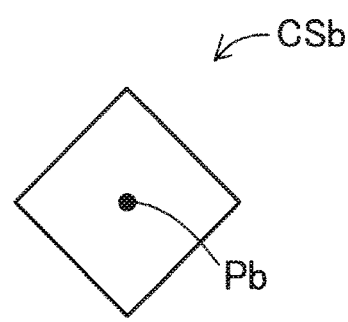
FIG. 24B is an explanatory diagram showing another shape of the cursor.

In the embodiments and the modifications, the UI element configuring the user interface is the arrow-shaped cursor CS. On the other hand, as a modification, a cursor having another shape may be used. FIG. 24A is an explanatory diagram showing a circular cursor CSa. A center Pa of the circle is a reference point of positioning in drawing. FIG. 24B is an explanatory diagram showing a diamond-shaped cursor CSb. A center Pb of the diamond shape is a reference point for positioning in drawing. The cursor does not need to be limited to the arrow, the circle, and the diamond shape and may be formed in other shapes.

Modification 2

As another shape of the cursor, a button shape can be adopted. ON/OFF of a button functioning as the cursor can be instructed by the touch pad 14, the direction key 16, and the determination key 17. By switching ON/OFF, the button-shaped cursor is switched between 3D display and 2D display. The 3D display is realized by forming a parallax in the display image of the cursor.

Modification 3

In the embodiments and the modifications, the UI element configuring the user interface is the cursor. On the other hand, as a modification, a software key may be the cursor. The "software key" refers to an input device (a key) reproduced in terms of software. The key is displayed on the screen. An input is performed by designating a key on the screen.

Figure 24C:
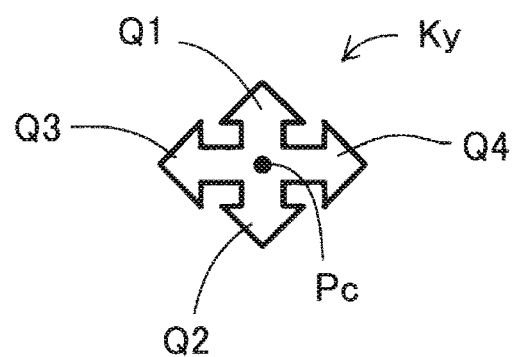
FIG. 24C is an explanatory diagram showing a software cross key.

FIG. 24C is an explanatory diagram showing a software cross key Ky serving as an example of the software key. The software cross key Ky includes arrow keys Q1 to Q4 respectively at the top and the bottom and on the left and the right. By designating the respective arrow keys Q1 to Q4, it is possible to move an object set as a target of operation of the software cross key Ky in the upward, downward, left, and right direction. A center Pc of the software cross key Ky is a reference point for positioning in drawing. The software cross key Ky can move a display position of the software cross key Ky according to operation of drag-and-drop.

According to the modification 3 having the configuration explained above, when the UI element is the software key, as in the embodiments and the modifications, when the software key is superimposed and displayed on a 3D image, the user can operate the software key with high operability. Note that the software key does not need to be limited to the software cross key and may be a software ten key (number key), a software keyboard, or the like.

Modification 4

Figure 25:
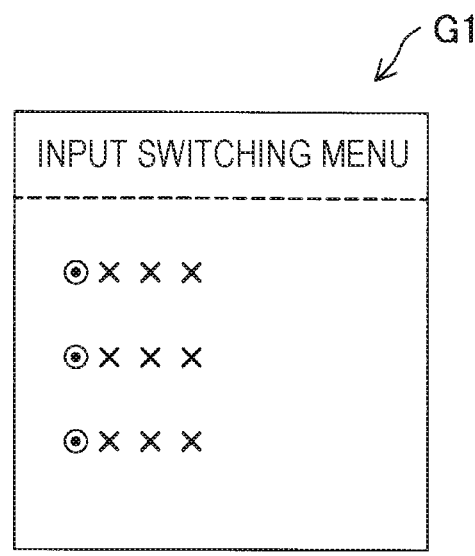
FIG. 25 is an explanatory diagram showing an example of an OSD display image.

In the embodiments and the modifications, the UI element configuring the user interface is the cursor. On the other hand, as a modification, the UI element may be an OSD (On Screen Display) display image. FIG. 25 is an explanatory diagram showing an example of the OSD display image. As shown in the figure, an OSD display image G1 shows an "input switching menu". A plurality of button switches are provided in the menu. The button switches are operated by the touch pad 14, the direction key 16, and the determination key 17. When the UI element is the OSD display image, as in the embodiments and the modifications, when the OSD display image is superimposed and displayed on the 3D image, the user can operate the OSD display image with high operability.

Modification 5

In the first and second embodiments, the cursor is two-dimensionally displayed. In the third embodiment, the cursor is three-dimensionally displayed. On the other hand, as a modification, the display device may include a cursor 2D display mode for two-dimensionally displaying the cursor and a cursor 3D display mode for three-dimensionally displaying the cursor and can be switched between the cursor 2D display mode and the cursor 3D display mode. For the switching of the modes, for example, a configuration may be adopted in which a switch for switching the modes is displayed on the screen and the user can operate the switch with the touch pad 14, the direction key 16, and the determination key 17. Further, a trigger of the switching of the modes may be a trigger by another component rather than the switch. For example, the direction of the image display section 20 is detected from a detection signal of the six-axis sensor 235 included in the image display section 20. When a change amount from the direction of the image display section 20 at the time when a 3D content is displayed exceeds a predetermined threshold (e.g., 45 degrees), the display of the cursor is switched from 3D to 2D.

Modification 6

Figure 26:
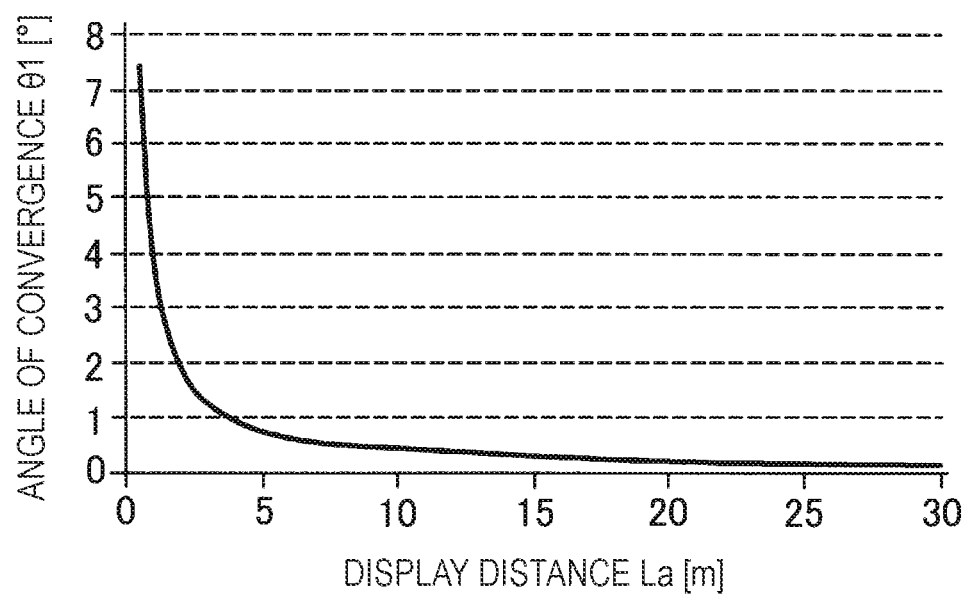
FIG. 26 is a diagram showing a relation between an angle of convergence and a display distance.

FIG. 26 is a diagram showing a relation between an angle of convergence $\theta 1$ and a display distance La. The "display distance" indicates an imaginary distance to an object recognized by the user when the user visually recognizes the object displayed on the image display section 20 rather than the distance between the image display section 20, which displays the object, and the user. As shown in FIG. 26, the display distance La decreases as the angle of convergence $\theta 1$ increases. In the HMD 100 in this embodiment, the angle of convergence $\theta 1$ at the time of initial setting is set such that the display distance La is 4 m. In this embodiment, the angle of convergence $\theta 1$ at the time of initial setting is, for example, 0.15°.

In a binocular-view transmission-type display device, a principal ray of image light is tilted to the inner side to provide a parallax and image correction by the image control section is further enabled to show as if the parallax (a value of the angle $\theta$) is simulatively changed. Consequently, it is possible to change an angle of convergence. For example, when it is desired to slightly change the parallax from a set parallax in order to adapt the parallax to AR, the parallax can be adjusted by such image correction. However, in the case explained above, for an image shift, a certain degree of a margin is necessary in image displayable ranges R and L. That is, unused regions are necessary. When an amount of the image shift increases, a problem of an inconsistency between the angle of convergence and the adjustment occurs. Therefore, a correction amount of the image correction by the image control section is desirably within a range corresponding to an angle difference equal to or smaller than ±1.0° from the parallax (the value of the angle $\theta$). Note that the number of pixels equivalent to +1.0° or −1.0° is equivalent to, for example, approximately several ten pixels depending on the resolution of a panel used in the image display device. By setting the image shift within this range, it is possible to change a sense of distance given to an observer by the image correction, that is, perform adjustment concerning the depth of an image. It is possible to more flexibly adapt the parallax to the AR. In this case, by performing the image correction in a range in which the angle difference is not excessively different from the set parallax, it is possible to reduce fatigue due to the inconsistency between the angle of convergence and the adjustment.

In the embodiments, concerning the range of the value of the angle $\theta$, as an example, the value of the angle $\theta$ is set to any value within the range of 1.0° to 5.0°. However, if the correction processing is taken into account, it is possible to adjust the angle of convergence within a range of 0.0° to 6.0°. In this case, judging from the human eyesight, it is possible to substantially cover a necessary work range. In the embodiments, as the specific example in which the value of the angle $\theta$ indicating the parallax is set to one value, the display distance is set to 4 m and the value of the corresponding angle $\theta$ is approximately 1°. In this case, if correction within a range corresponding to the angle difference equal to or smaller than ±1.0° is performed, it is possible to adjust the angle of convergence in a range of 0.0° to 2.0°. In this case, as it is evident with reference to a diagram of the convergence angle and the display distance, it is possible to perform the adjustment concerning a wide range from a distance to a place felt relatively close. That is, it is possible to realize a transmission-type display device suitable for the adaptation to the AR simply by providing a correction function for a slight image shift without complicating an optical configuration.

Modification 7

A part of the components realized by hardware in the embodiments and the modifications may be replaced with software. Conversely, a part of the components realized by software in the embodiments and the modifications may be replaced with the hardware.

Modification 8

In the embodiments and the modifications, the 3D content is the file of the side-by-side system. On the other hand, as a modification, the 3D content may be a file of the top-and-button system. In this case, the lateral direction in the first embodiment is changed to the longitudinal direction and the longitudinal direction in the first embodiment is changed to the lateral direction. In the embodiments and the modifications, the 3D content is the moving image. However, the 3D content may be a still image.

Modification 9

In the embodiments and the modifications, the display device is the head-mounted display device. However, the display device does not always need to be mounted on the head. For example, the display device may be fixed in a predetermined position. Further, the display device may be suspended from a shoulder.

Modification 10

In the embodiments, the configuration of the HMD is illustrated. However, the configuration of the HMD can be optionally decided without departing from the spirit of the invention. For example, addition, deletion, conversion, and the like of the components can be performed.

In the embodiments, the HMD 100 of a so-called transmission type in which the right light guide plate 26 and the left light guide plate 28 transmit external light is explained. However, the present invention can also be applied to, for example, the HMD 100 of a so-called non-transmission type that displays an image without transmitting an outside scene. The HMD 100 of the non-transmission type only has to image an outside scene with a camera and display a captured image of the outside scene on the display section. These HMDs 100 can perform, besides the AR (Augmented Reality) display for superimposing and displaying an image on a real space explained in the embodiments, MR (Mixed Reality) display for combining and displaying a captured image of the real space and a virtual image or VR (Virtual Reality) display for displaying a virtual space.

In the embodiments, the functional sections of the control device 10 and the image display device 20 are explained. However, the functional sections can be optionally changed. For example, forms explained below may be adopted. A form in which the storage function section 122 and the control function section 150 are mounted on the control device 10 and only a display function is mounted on the image display section 20. A form in which the storage function section 122 and the control function section 150 are mounted on both of the control device 10 and the image display section 20. A form in which the control device 10 and the image display section 20 are integrated. In this case, for example, all the components of the control device 10 are included in the image display section 20. The image display section 20 is configured as an eyeglass-type wearable computer. A form in which a smartphone or a portable game machine is used instead of the control device 10. A form in which the control device 10 and the image display section 20 are connected by wireless communication and the connection cable 40 is removed. In this case, for example, power supply to the control device 10 and the image display section 20 may be wirelessly carried out.

Modification 11

In the embodiments, the configuration of the control device is illustrated. However, the configuration of the control device can be optionally decided without departing from the spirit of the invention. For example, addition, deletion, conversion, and the like of the components can be performed.

In the embodiments, the example of the input means included in the control device 10 is explained. However, the control device 10 may be configured by omitting a part of the illustrated input means or may include other input means not explained above. For example, the control device 10 may include an operation stick, a keyboard, a mouse, and the like. For example, the control device 10 may include input means for interpreting commands associated with a movement and the like of the body of the user. The movement and the like of the body of the user can be acquired by, for example, line-of-sight detection for detecting a line of sight, gesture detection for detecting a movement of hands, a footswitch that detects a movement of feet. Note that the line-of-sight detection can be realized by, for example, a camera that images the inner side of the image display section 20. The gesture detection can be realized by, for example, analyzing images photographed by the camera 61 over time.

In the embodiments, the control function section 150 operates when the main processor 140 executes the computer program in the storage function section 122. However, various configurations can be adopted as the control function section 150. For example, the computer program may be stored in the nonvolatile storing section 121, the EEPROM 215, the memory 118, or other external storage devices (including storage devices such as USB memories inserted into various interfaces and an external device such as a server connected via a network) instead of or together with the storage function section 122. The functions of the control function section 150 may be realized using ASICs (Application Specific Integrated Circuits) designed to realize the functions.

Modification 12

In the embodiments, the configuration of the image display section is illustrated. However, the configuration of the image display section can be optionally decided without departing from the spirit of the invention. For example, addition, deletion, conversion, and the like of the components can be performed.

Figure 27:
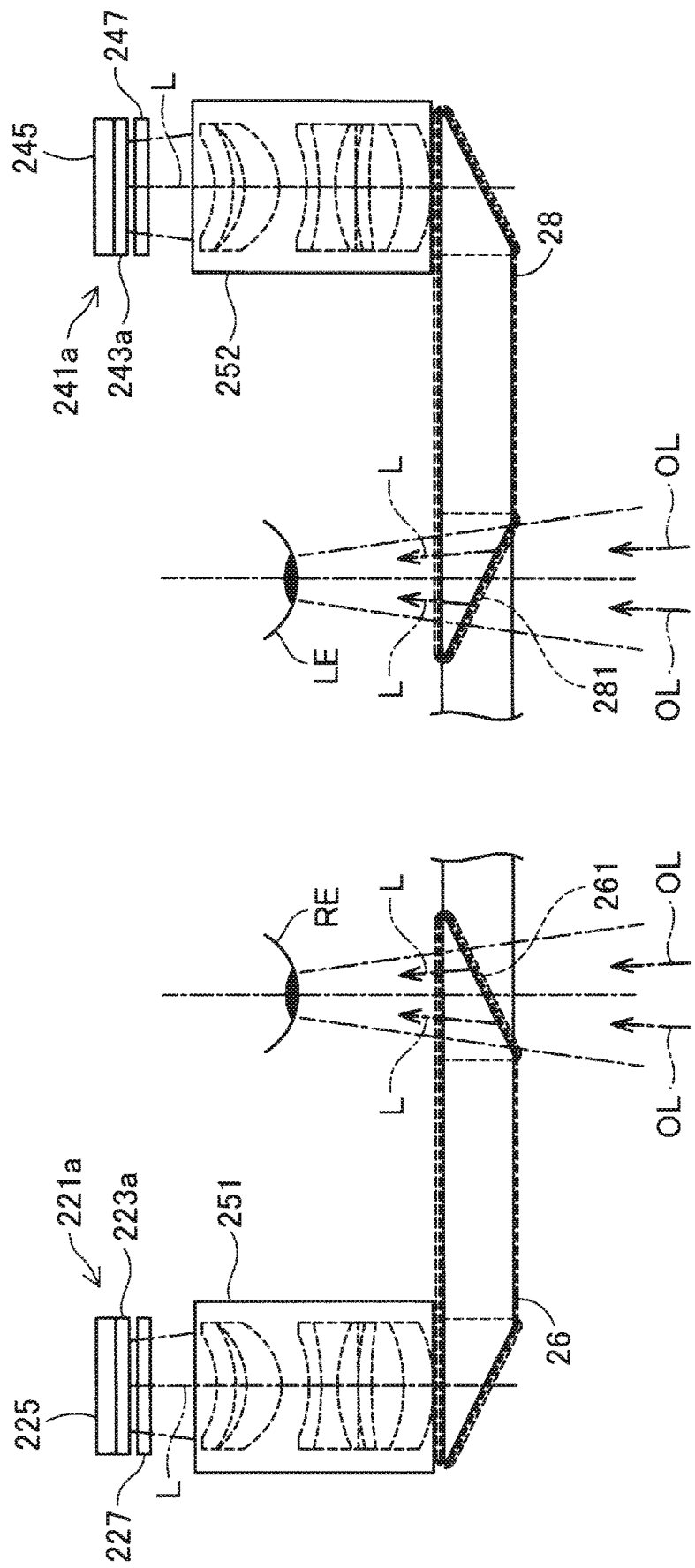
FIG. 27 is a main part plan view showing the configuration of an optical system included in an image display section in a modification.

FIG. 27 is a main part plan view showing the configuration of an optical system included in an image display section in a modification. In the image display section in the modification, an OLED unit 221a corresponding to the right eye RE of the user and an OLED unit 241a corresponding to the left eye LE of the user are provided. The OLED unit 221a corresponding to the right eye RE includes an OLED panel 223a that emits light in white and the OLED driving circuit 225 that drives the OLED panel 223a to emit light. A modulating element 227 (a modulating device) is disposed between the OLED panel 223a and the right optical system 251. The modulating element 227 is configured by, for example, a transmission-type liquid crystal panel. The modulating element 227 modulates the light emitted by the OLED panel 223a to generate the image light L. The image light L transmitted through the modulating element 227 to be modulated is guided to the right eye RE by the right light guide plate 26.

The OLED unit 241a corresponding to the left eye LE includes an OLED panel 243a that emits light in white and the OLED driving circuit 245 that drives the OLED panel 243a to emit light. A modulating element 247 (a modulating device) is disposed between the OLED panel 243a and the left optical system 252. The modulating element 247 is configured by, for example, a transmission-type liquid crystal panel. The modulating element 247 modulates the light emitted by the OLED panel 243a to generate the image light L. The image light L transmitted through the modulating element 247 to be modulated is guided to the left eye LE by the left light guide plate 28. The modulating elements 227 and 247 are connected to a not-shown liquid crystal driver circuit. The liquid crystal driver circuit (a modulating-device driving section) is mounted on, for example, a substrate disposed in the vicinity of the modulating elements 227 and 247.

With the image display section in the modification, the right display unit 22 and the left display unit 24 are respectively configured as video elements including the OLED panels 223a and 243a functioning as light source sections and the modulating elements 227 and 247 that modulate lights emitted by the light source sections and output image lights including a plurality of color lights. Note that the modulating devices that modulate the lights emitted by the OLED panels 223a and 243a are not limited to the configuration in which the transmission-type liquid crystal panel is adopted. For example, a reflection-type liquid crystal panel may be used instead of the transmission-type liquid crystal panel. A digital micro-mirror device may be used. The HMD 100 may be the HMD 100 of a laser retinal projection type.

In the embodiments, the eyeglass-type image display section 20 is explained. However, a form of the image display section 20 can be optionally changed. For example, the image display section 20 may be worn like a hat or may be incorporated in a body protector such as a helmet. The image display section 20 may be configured as a HUD (Head Up Display) mounted on vehicles such as an automobile and an airplane or other transportation means.

In the embodiments, as the optical system that guides image light to the eyes of the user, the configuration is illustrated in which a virtual image is formed on a part of the right light guide plate 26 and the left light guide plate 28 by the half mirrors 261 and 281. However, the configuration can be optionally changed. For example, a virtual image may be formed in regions occupying the entire (or most of) right guide plate 26 and left light guide plate 28. In this case, an image may be reduced by operation for changing a display position of the image. The optical element according to the invention is not limited to the right light guide plate 26 and the left light guide plate 28 including the half mirrors 261 and 281. Any form can be adopted as long as an optical component (e.g., a diffraction grating, a prism, or holography) that makes image light incident on the eyes of the user is used.

The invention is not limited to the embodiments, the examples, and the modifications explained above and can be realized in various configurations without departing from the spirit of the invention. For example, the technical features in the embodiments, the examples, and the modifications corresponding to the technical features in the aspects described in the summary of the invention can be replaced or combined as appropriate in order to solve a part or all of the problems explained above or in order to achieve a part or all of the effects explained above. Unless the technical features are explained as essential technical features in this specification, the technical features can be deleted as appropriate.

The entire disclosure of Japanese Patent Application No. 2017-028665, filed Feb. 20, 2017 is expressly incorporated by reference herein.

What is claimed is:

1. A display device that superimposes and displays a UI element configuring a user interface on a 3D image, the display device comprising:
    a left image display disposed in front of a left eye of the user;
    a right image display disposed in front of a right eye of the user;
    a memory storing 3D image data in which, with a lateral direction or a longitudinal direction set as a predetermined direction, one frame is configured by image data for left eye and image data for right eye compressed in the predetermined direction; and
    a processor or integrated circuit configured to:
        acquire compressed UI image data obtained by compressing image data of the UI element in the predetermined direction,
        draw the compressed UI image data in a predetermined position of one of the image data for left eye before the expansion and the image data for right eye before the expansion,
        draw the compressed UI image data in a position corresponding to the predetermined position of the other of the image data for left eye before the expansion and the image data for right eye before the expansion, and
        expand the compressed UI image data at the position over the image data for the left eye after the drawing and for the image data for the right eye after the drawing from the 3D image data respectively in the predetermined direction,
        cause the left image display to display the expanded image data for the left eye, and
        cause the right image display to display the expanded image data for the right eye.

2. The display device according to claim 1, wherein the 3D image data is image data of a file format of a side-by-side system.

3. The display device according to claim 1, wherein the UI element is a cursor.

4. The display device according to claim 3, wherein the processor or integrated circuit is further configured to:
    designate a position of the cursor on a screen, wherein when the designated position overlaps a region for display for displaying the 3D image, the processor or integrated circuit sets, as the predetermined position, a relative position of the designated position in the region for display.

5. The display device according to claim 1, wherein the UI element is an OSD display image.

6. The display device according to claim 1, wherein the predetermined position and the position corresponding to the predetermined position are an identical coordinate position in image data respectively corresponding to the predetermined position and the position corresponding to the predetermined position.

7. The display device according to claim 1, wherein the predetermined position and the position corresponding to the predetermined position are decided such that a parallax is formed between an image of the UI element drawn on the image data for left eye after the expansion and an image of the UI element drawn on the image data for right eye after the expansion.

8. The display device according to claim 7, further comprising
a distance sensor configured to detect a distance to an object that operates the UI element, wherein
the predetermined position and the position corresponding to the predetermined position are respectively decided according to the detected distance.

9. The display device according to claim 2, wherein, when the compressed UI image data is drawn in the one predetermined position, when a drawing range of the compressed UI image data straddles across a boundary line between the image data for left eye and the image data for right eye, only a partial image of the compressed UI image data included in a side of one of the image data for left eye and the image data for right eye is drawn.

10. The display device according to claim 1, wherein the display device is a head-mounted display device that is mounted on a head of a user.

11. A control method for a display device that superimposes and displays a UI element configuring a user interface on a 3D image,
the display device including:
a left image display disposed in front of a left eye of the user;
a right image display disposed in front of a right eye of the user;
a memory storing 3D image data in which, with a lateral direction or a longitudinal direction set as a predetermined direction, one frame is configured by image data for left eye and image data for right eye compressed in the predetermined direction,
the control method comprising:
acquiring, by a processor or integrated circuit, compressed UI image data obtained by compressing image data of the UI element in the predetermined direction,
drawing, by the processor or integrated circuit, the compressed UI image data in a predetermined position of one of the image data for left eye before the expansion and the image data for right eye before the expansion,
drawing, by the processor or integrated circuit, the compressed UI image data in a position corresponding to the predetermined position of the other of the image data for left eye before the expansion and the image data for right eye before the expansion, and
expanding, by the processor or integrated circuit, the compressed UI image data at the position over the image data for the left eye after the drawing and for the image data for the right eye after the drawing from the 3D image data respectively in the predetermined direction,
causing the left image display to display the expanded image data for the left eye, and
causing the right image display to display the expanded image data for the right eye.

* * * * *